(12) United States Patent
Sugawara et al.

(10) Patent No.: US 11,064,594 B2
(45) Date of Patent: Jul. 13, 2021

(54) PAIRING METHOD AND PAIRING DEVICE

(71) Applicant: Panasonic Intellectual Property Management Co., Ltd., Osaka (JP)

(72) Inventors: Hiroshi Sugawara, Hyogo (JP); Yuto Hidaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 404 days.

(21) Appl. No.: 16/257,835

(22) Filed: Jan. 25, 2019

(65) Prior Publication Data

US 2019/0235046 A1 Aug. 1, 2019

(30) Foreign Application Priority Data

Jan. 30, 2018 (JP) .............................. JP2018-014110

(51) Int. Cl.
| | |
|---|---|
| *H05B 47/19* | (2020.01) |
| *G01S 5/02* | (2010.01) |
| *H04W 8/00* | (2009.01) |
| *H04W 64/00* | (2009.01) |
| *H04W 76/14* | (2018.01) |

(52) U.S. Cl.
CPC ............ *H05B 47/19* (2020.01); *G01S 5/0284* (2013.01); *H04W 8/005* (2013.01); *H04W 64/003* (2013.01); *H04W 76/14* (2018.02)

(58) Field of Classification Search
CPC combination set(s) only.
See application file for complete search history.

(56) References Cited

U.S. PATENT DOCUMENTS

2005/0248299 A1* 11/2005 Chemel ................ H05B 47/155
 315/312
2012/0299509 A1* 11/2012 Lee ..................... H04L 41/0806
 315/291

(Continued)

FOREIGN PATENT DOCUMENTS

| JP | 2017-063057 A | 3/2017 |
| JP | 2017-162700 A | 9/2017 |
| JP | 2017-162730 A | 9/2017 |

*Primary Examiner* — Cindy Trandai
(74) *Attorney, Agent, or Firm* — McDermott Will & Emery LLP

(57) ABSTRACT

A pairing method for determining communication partners among luminaires and wireless interface (IF) devices, including: generating provisional pairing data by assigning provisional addresses to the luminaires and the wireless IF devices indicated on the layout map and by associating the provisional addresses assigned to the wireless IF devices with the provisional addresses assigned to the luminaires in a one-to-many relationship; in a hardware installation phase in which the luminaires and the wireless IF devices are installed in accordance with the layout map, generating final pairing data by associating the provisional addresses in the provisional pairing data with pre-assigned actual addresses; and notifying the luminaires and the wireless IF devices of each of the actual addresses each is associated with in the final pairing data, and causing the luminaires and the wireless IF devices to store, as an actual address of a communication partner, each of the notified actual addresses.

20 Claims, 17 Drawing Sheets

(56) References Cited

U.S. PATENT DOCUMENTS

| | | | | |
|---|---|---|---|---|
| 2013/0141009 A1* | 6/2013 | Jin | ............... | G08C 17/02 |
| | | | | 315/292 |
| 2014/0062334 A1* | 3/2014 | Nagazoe | ............... | H05B 47/125 |
| | | | | 315/292 |
| 2015/0123563 A1* | 5/2015 | Dahlen | ............... | H05B 47/19 |
| | | | | 315/294 |
| 2015/0220428 A1* | 8/2015 | Simonyi | ............... | G06F 12/0207 |
| | | | | 340/2.26 |
| 2015/0334811 A1* | 11/2015 | So | ............... | H05B 47/165 |
| | | | | 315/152 |
| 2016/0302288 A1* | 10/2016 | Gotoh | ............... | G08C 23/04 |
| 2017/0027043 A1* | 1/2017 | Greene | ............... | H04W 40/22 |
| 2017/0105129 A1* | 4/2017 | Teplin | ............... | H04L 41/0806 |
| 2017/0265284 A1 | 9/2017 | Yamauchi et al. | | |
| 2018/0007516 A1* | 1/2018 | Ge | ............... | H04W 64/00 |
| 2018/0124895 A1* | 5/2018 | Alexander | ............... | G06F 3/041 |
| 2018/0219869 A1* | 8/2018 | Kumar | ............... | H04W 64/003 |
| 2018/0242418 A1* | 8/2018 | Hidaka | ............... | H05B 47/165 |
| 2018/0270933 A1* | 9/2018 | Hu | ............... | H04L 41/0893 |
| 2018/0317302 A1* | 11/2018 | Setomoto | ............... | F21V 3/049 |
| 2019/0053356 A1* | 2/2019 | Hiramatsu | ............... | H04W 52/36 |

* cited by examiner

FIG. 12

| DESIGN DATA | | | | |
|---|---|---|---|---|
| LUMINAIRE | COORDINATES | DIMENSIONS | ILLUMINANCE | ... |
| MODEL# 1 | (X1,Y1,Z1) | W1,H1.T1 | 200 | |
| MODEL# 1 | (X2,Y2,Z2) | : | : | |
| : | : | : | : | |
| MODEL# 1 | (X16,Y16,Z16) | : | : | |
| MODEL# 1 | (X17,Y17,Z17) | : | : | |
| MODEL# 1 | (X18,Y18,Z18) | : | : | |
| : | : | : | : | |
| MODEL# 1 | (X32,Y32,Z32) | : | : | |

| PROVISIONAL PAIRING DATA FOR LUMINAIRES 67a | | |
|---|---|---|
| LUMINAIRE COORDINATES | PROVISIONAL ADDRESS | COMMUNICATION PARTNER PROVISIONAL ADDRESS |
| (X1,Y1,Z1) | A | A |
| (X2,Y2,Z2) | A | A |
| ⋮ | ⋮ | ⋮ |
| (X16,Y16,Z16) | A | A |
| (X17,Y17,Z17) | B | B |
| (X18,Y18,Z18) | B | B |
| ⋮ | ⋮ | ⋮ |
| (X32,Y32,Z32) | B | B |

FIG. 16

| PROVISIONAL PAIRING DATA FOR WIRELESS IF DEVICES 67b | | |
|---|---|---|
| WIRELESS IF DEVICE COORDINATES | PROVISIONAL ADDRESS | COMMUNICATION PARTNER PROVISIONAL ADDRESS |
| (Xa,Ya,Za) | A | A,A,⋯,A |
| (Xb,Yb,Zb) | B | B,B,⋯,B |
| ⋮ | ⋮ | ⋮ |

FIG. 21

| | | 68a | | |
|---|---|---|---|---|
| FINAL PAIRING DATA FOR LUMINAIRES | | | | |
| LUMINAIRE POSITION | PROVISIONAL ADDRESS | ACTUAL ADDRESS | COMMUNICATION PARTNER PROVISIONAL ADDRESS | COMMUNICATION PARTNER ACTUAL ADDRESS |
| (X1,Y1) | A | P9 | A | Pa |
| (X2,Y2) | A | P16 | A | Pa |
| ⋮ | ⋮ | ⋮ | ⋮ | ⋮ |
| (X16,Y16) | A | P26 | A | Pa |
| (X17,Y17) | B | P17 | B | Pb |
| (X18,Y18) | B | P14 | B | Pb |
| ⋮ | ⋮ | ⋮ | ⋮ | ⋮ |
| (X32,Y32) | B | P19 | B | Pb |

FIG. 22

| | | 68b | | |
|---|---|---|---|---|
| FINAL PAIRING DATA FOR WIRELESS IF DEVICES | | | | |
| WIRELESS IF DEVICE POSITION | PROVISIONAL ADDRESS | ACTUAL ADDRESS | COMMUNICATION PARTNER PROVISIONAL ADDRESS | COMMUNICATION PARTNER ACTUAL ADDRESS |
| (Xa,Ya) | A | Pa | A,A,⋯,A | P9,P16,P3,P24,P31,P6, P22,P8,P1,P10,P28,P12, P29,P18,P15,P26 |
| (Xb,Yb) | B | Pb | B,B,⋯,B | P17,P14,P32,P20,P21, P7,P23,P4,P25,P9,P27, P11,P13,P30,P5,P19 |
| ⋮ | ⋮ | | ⋮ | ⋮ |

| \_\_\_\_ 69 OPERATIONAL GROUP DATA | | |
|---|---|---|
| GROUP | ACTUAL ADDRESSES OF MEMBERS | SWITCH |
| G1 | P9,P16,P3,P24, P31,P6,P22,P8, P1,P10,P28,P12, P29,P18,P15,P26 | 4a |
| G2 | P17,P14,P32,P20, P21,P7,P23,P4, P25,P9,P27,P11, P13,P30,P5,P19 | 4b |
| : | : | : |

| OPERATIONAL GROUP DATA ||| 
|---|---|---|
| GROUP | ACTUAL ADDRESSES OF MEMBERS | SWITCH |
| G1a | P9,P16,P3,P24, P31,P6,P22,P8, P1,P10,P28,P12, P29,P18,P15,P26, P17,P21,P25,P13 | 4a |
| G2a | P14,P32,P20, P7,P23,P4, P9,P27,P11, P30,P5,P19 | 4b |
| : | : | : |

FIG. 27

68a
| FINAL PAIRING DATA FOR LUMINAIRES | | | |
|---|---|---|---|
| LUMINAIRE MODEL# | LUMINAIRE POSITION | ACTUAL ADDRESS | COMMUNICATION PARTNER ACTUAL ADDRESS |
| OOOO | (X1,Y1,Z1) | P9 | Pa |
| OOOO | (X2,Y2xZ2) | P16 | Pa |
| : | : | : | : |
| OOOO | (X16,Y16,Z16) | P26 | Pa |
| OOOO | (X17,Y17,Z17) | P17 | Pa |
| OOOO | (X18,Y18,Z18) | P14 | Pb |
| : | : | : | : |
| OOOO | (X32,Y32,Z32) | P19 | Pb |

FIG. 28

68b
| FINAL PAIRING DATA FOR WIRELESS IF DEVICES | | |
|---|---|---|
| WIRELESS IF DEVICE POSITION | ACTUAL ADDRESS | COMMUNICATION PARTNER ACTUAL ADDRESS |
| (Xa,Ya,Za) | Pa | P9,P16,P3,P24, P31,P6,P22,P8, P1,P10,P28,P12, P29,P18,P15,P26, P17,P21,P25,P13 |
| (Xb,Yb,Zb) | Pb | P14,P32,P20, P7,P23,P4, P9,P27,P11, P30,P5,P19 |
| : | : | : |

PAIRING METHOD AND PAIRING DEVICE

CROSS REFERENCE TO RELATED APPLICATION

This application claims the benefit of priority of Japanese Patent Application Number 2018-014110 filed on Jan. 30, 2018, the entire content of which is hereby incorporated by reference.

BACKGROUND

1. Technical Field

The present disclosure relates to a pairing method and a pairing device for use in a lighting system including a plurality of wireless interface (IF) devices that wirelessly transmit a control signal and a plurality of luminaires that receive the control signal, to determine communication partners among the plurality of luminaires and the plurality of wireless IF devices.

2. Description of the Related Art

Japanese Unexamined Patent Application Publication No. 2017-63057 proposes a lighting control system capable of exclusively controlling lighting in a predetermined region within a lighting area.

The lighting system disclosed in Japanese Unexamined Patent Application Publication No. 2017-162700 includes a plurality of luminaires disposed in a lighting area and a terminal device. The terminal device includes an obtaining unit that obtains drawing data which is image data showing a layout of the luminaires in the lighting area, and an assigning unit that assigns, to each of the luminaires in the drawing data, at least one of an identification and a specification of the luminaire.

Japanese Unexamined Patent Application Publication No. 2017-162730 proposes a lighting system, luminaire, and terminal device capable of completing mapping in a lighting system simply and with certainty. Here, "mapping" means associating information that identifies each luminaire recognized by the terminal device (hereinafter this information is referred to as "logical address") with a transmission address set in advance in each luminaire, for receiving a control command, and storing the associations.

SUMMARY

In the background art, pairing that determines communication partners between luminaires and wireless IF devices is problematic in that it requires a great amount of time and work when there are many luminaires in the lighting system.

The present disclosure has an object to provide a pairing method and a pairing device that reduce the time and work required to perform pairing.

In order to achieve the object described above, a pairing method according to one embodiment of the present disclosure is for determining communication partners among a plurality of luminaires and a plurality of wireless interface (IF) devices, and includes: obtaining a layout map indicating a layout of the plurality of luminaires and the plurality of wireless IF devices; displaying the layout map on a display; generating provisional pairing data by assigning provisional addresses to the plurality of luminaires and the plurality of wireless IF devices indicated on the displayed layout map and by associating the provisional addresses assigned to the plurality of wireless IF devices with the provisional addresses assigned to the plurality of luminaires in a one-to-many relationship; storing the provisional pairing data into a memory; in a hardware installation phase in which the plurality of luminaires and the plurality of wireless IF devices are installed in accordance with the layout map, generating final pairing data by associating the provisional addresses in the provisional pairing data with actual addresses of the plurality of luminaires, which are pre-assigned to the plurality of luminaires; and notifying the plurality of luminaires and the plurality of wireless IF devices of each of the actual addresses each is associated with in the final pairing data, and causing the plurality of luminaires and the plurality of wireless IF devices to store, as an actual address of a communication partner, each of the actual addresses notified.

With the pairing method and the pairing device according to the present disclosure, it is possible to reduce the time and work required to perform pairing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 12 illustrates one example of design data stored in the storage unit of the terminal device according to the embodiment;

FIG. 15 illustrates an example of provisional pairing data for the luminaires generated by the pairing method according to the embodiment;

FIG. 16 illustrates an example of provisional pairing data for the wireless IF devices generated by the pairing method according to the embodiment;

FIG. 21 illustrates an example of final pairing data for the luminaires generated by the pairing method according to the embodiment;

FIG. 22 illustrates an example of final pairing data for the wireless IF devices generated by the pairing method according to the embodiment;

FIG. 27 illustrates one example of final pairing data corresponding to the operational groups illustrated in FIG. 23; and FIG. 28 illustrates one example of final pairing data corresponding to the changed operational groups illustrated in FIG. 25.

DETAILED DESCRIPTION OF THE EMBODIMENT

The following describes an embodiment with reference to the drawings. The embodiment described below shows a preferred, specific example of the present disclosure. The numerical values, shapes, materials, elements, the arrangement and connection of the elements, steps, order of the steps, etc., indicated in the following embodiment are mere examples, and therefore do not intend to limit the present disclosure. Therefore, among elements in the following embodiments, those not recited in any of the broadest, independent claims are described as optional elements.

Embodiment (1. Terminal Device and Lighting System Configuration Example)

Before describing the terminal device, which functions as the pairing device, first, an example of the overall configuration of the lighting system, in which the pairing is to be performed, will be given.

Figure 1:
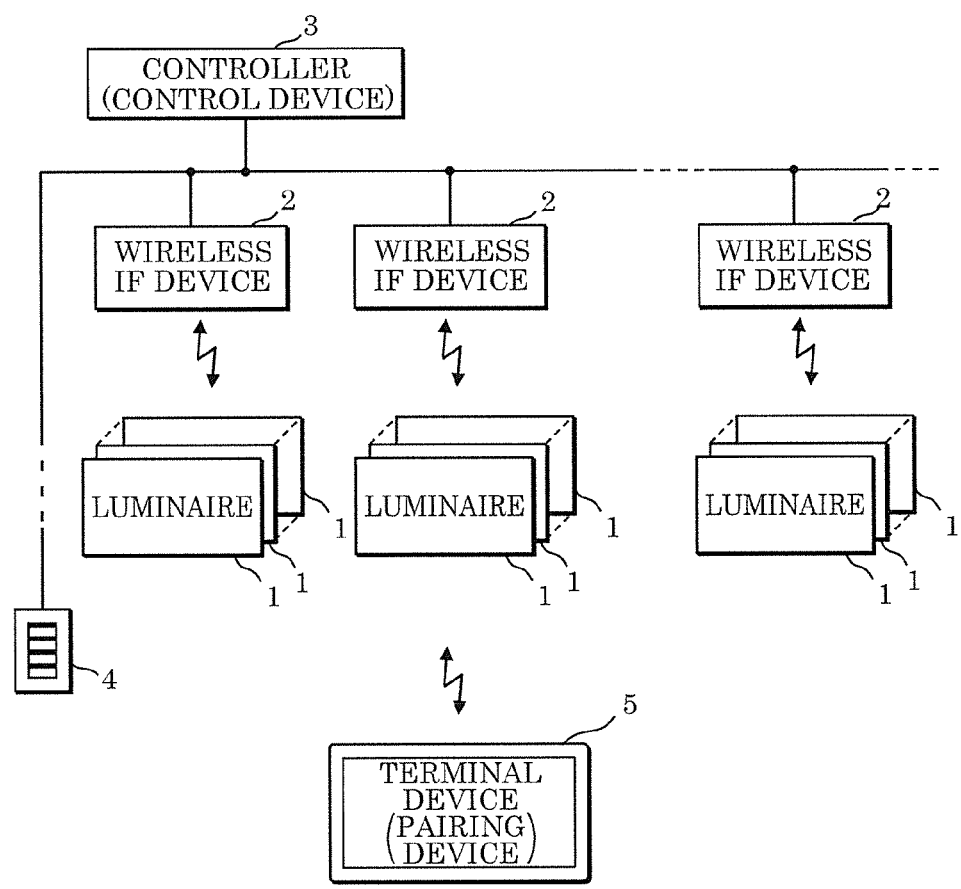
FIG. 1 illustrates an example of a configuration of a lighting system according to an embodiment.

FIG. 1 illustrates an example of a configuration of terminal device 5 and a lighting system according to the embodiment.

The lighting system illustrated in FIG. 1 includes a plurality of luminaires 1, a plurality of wireless interface (IF) devices 2, controller 3, and switch panel 4. Controller 3 is also referred to as a control device. Terminal device 5 is a device that performs pairing, i.e., the determining communication partners, from among luminaires 1 and wireless IF devices 2, and is also referred to as a pairing device.

In FIG. 1, each of the plurality of luminaires 1 receives a control signal transmitted from one of the plurality of wireless IF devices 2, and operates in accordance with the received control signal For example, the control signal includes an instruction to emit light, cease emitting light, or dim. The "one of the plurality of wireless IF devices 2" recited above refers to the wireless IF device 2 that the luminaire 1 is paired with. Pairing means determining communication partners from among luminaires and wireless IF devices. More specifically, pairing means storing, in the luminaires and the wireless IF devices, an actual address of a communication partner, as information indicating the communication partner. With this, when the address of the source of the control signal received by a luminaire 1 matches the actual address of a communication partner stored in the luminaire 1, the luminaire 1 operates in accordance with the control signal, and when the address does not match, the luminaire 1 disregards or discards the control signal. When the address of the source of a signal (for example, a response signal) received by a wireless IF device 2 from a luminaire 1 matches the actual address of the communication partner stored in the wireless IF device 2, the wireless IF device 2 operates in accordance with the signal, and when the address does not match, the wireless IF device 2 disregards or discards the signal.

Note that the terminology "actual address" is used in contrast to the terminology "provisional address". Here, an actual address is an address unique to each luminaire 1 or each wireless IF device 2, and refers to the address actually used in communications. The actual address may be a physical address or a logical address. For example, the actual address may be a media access control (MAC) address or an internet protocol (IP) address. A "provisional address" is a placeholder used in the design phase of the lighting system, that is to say, before the actual luminaires 1 and wireless IF devices 2 are provided (or are specified). Stated differently, the provisional address is a temporary, virtual address provisionally assigned as a placeholder for the actual address while the actual address is still unknown. The provisional addresses are used for provisional pairing in the design phase.

Each wireless IF device 2 is connected to controller 3 via a wired communications path, and is connected, via a wireless communications path, to paired luminaire(s) 1 among the plurality of luminaires 1. Each wireless IF device 2 receives, from controller 3 via a wired communications path, a control signal addressed to a luminaire 1, and if the destination of the control signal is a luminaire 1 the wireless IF device 2 is paired with, the wireless IF device 2 relays the control signal to the luminaire 1 via a wireless communications path. Moreover, each wireless IF device 2 receives a signal (for example, a response signal) from a paired luminaire 1 via a wireless communications path, and relays the signal to controller 3 via a wired communications path.

The plurality of luminaires 1 are divided into a plurality of operational groups of luminaires 1 that are to perform like lighting operations. For example, an operational group is a group of luminaires 1 that belong to the same room, same department, same sales area, same classroom, or same section.

Controller 3 transmits control signals for controlling lighting operations to luminaires 1 via wireless IF devices 2. The control signal instructs luminaires 1 to, for example, emit light, cease emitting light, dim, or change color. Controller 3 is capable of, for example, controlling lighting operations per operational group in accordance with lighting schedule data set in advance and inputs made by a user via switch panel 4.

Switch panel 4 includes, for example, a plurality of switches and dimming knobs, and receives inputs made by a user. For example, the plurality of switches and dimming knobs correspond to the plurality of operational groups.

Terminal device 5 executes a pairing method for use in a lighting system including a plurality of wireless IF devices 2 that wirelessly transmit a control signal and a plurality of luminaires 1 that receive the control signal, to determine communication partners among the plurality of luminaires 1 and the plurality of wireless IF devices 2. Since terminal device 5 is used in the design phase of the lighting system, the installation phase of the lighting system, and when making operational changes, terminal device 5 may be a temporary element in the lighting system, and need not be a permanent element in the lighting system.

(1.1 Luminaire 1 Configuration Example)

Next, an example of a configuration of luminaire 1 will be given.

Figure 2:
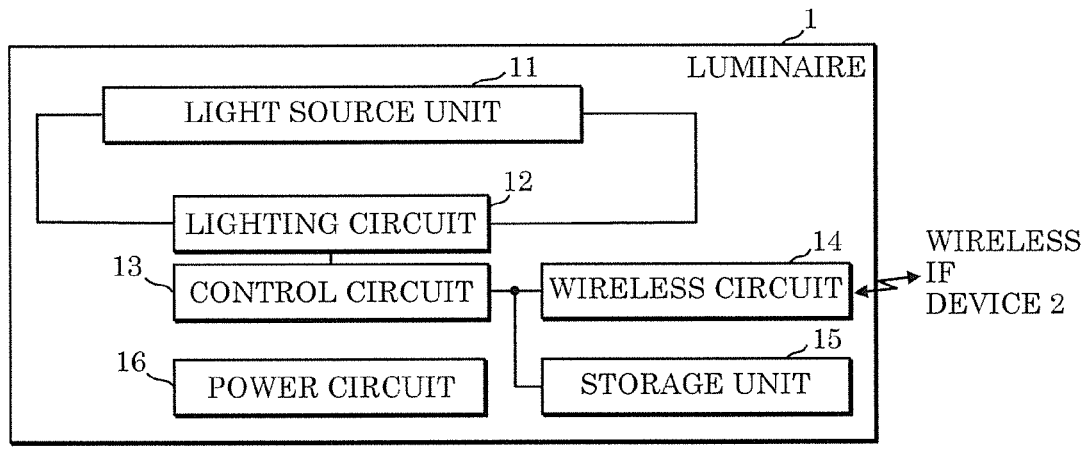
FIG. 2 illustrates an example of a configuration of a luminaire according to the embodiment.

FIG. 2 illustrates an example of a configuration of luminaire 1 according to the embodiment. As illustrated in FIG. 2, luminaire 1 includes light source unit 11, lighting circuit 12, control circuit 13, wireless circuit 14, storage unit 15, and power circuit 16.

Light source unit 11 includes a light source and emits light for illuminating a space. The light source may be, for example, a light emitting diode (LED), fluorescent light, or incandescent light.

Lighting circuit 12 causes light source unit 11 to emit light by supplying light source unit 11 with power.

Control circuit 13 controls lighting operations performed by luminaire 1 by controlling lighting circuit 12. Control circuit 13 controls, as examples of lighting operations, the emission and non-emission of light by light source unit 11, in accordance with a control signal received by wireless circuit 14. Furthermore, control circuit 13 may control the dimming and color of the light.

Wireless circuit 14 receives the control signal wirelessly transmitted from wireless IF device 2 and sends control circuit 13 the control signal. Moreover, wireless circuit 14 wirelessly transmits a response signal received from control circuit 13 to wireless IF device 2.

Next, an example of how the control signal is handled in luminaire 1 will be given. The control signal includes a destination address, a source address, and a command. In the control signal transmitted from a wireless IF device 2 to a luminaire 1, the destination address is set as the actual address of the luminaire 1, and the source address is set as the actual address of the wireless IF device 2.

For example, the destination address is handled as follows. When control circuit 13 receives a control signal transmitted from wireless circuit 14 whose destination address matches its own actual address (i.e., the actual address of the luminaire 1 including the control circuit 13 that received the control signal), control circuit 13 controls lighting circuit 12 in accordance with the control signal. In contrast, when control circuit 13 receives a control signal transmitted from wireless circuit 14 whose destination address does not match its own actual address, control circuit 13 does not control lighting circuit 12 in accordance with the control signal, and discards the control signal.

For example, the source address is handled as follows. When control circuit 13 receives a control signal transmitted from wireless circuit 14 whose source address matches the actual address of its communication partner (i.e., the actual address of wireless IF device 2 functioning as the communication partner), control circuit 13 controls lighting circuit 12 in accordance with the control signal. In contrast, when control circuit 13 receives a control signal transmitted from wireless circuit 14 whose source address does not match the actual address of its communication partner, control circuit 13 does not control lighting circuit 12 in accordance with the control signal, and discards the control signal.

The command included in the control signal is a signal that instructs luminaire 1 to perform a lighting operation, such as instructing luminaire 1 to, for example, emit light, cease emitting light, dim, or change color.

Storage unit 15 in FIG. 2 is memory for storing the actual address of any one of wireless IF devices 2 as information indicating a communication partner. When luminaire 1 is shipped, no information indicating a communication partner is stored in storage unit 15. As a result of luminaire 1 pairing with terminal device 5, luminaire 1 obtains information indicating a communication partner from terminal device 5 by way of a control signal including the information indicating a communication partner. When wireless circuit 14 receives a control signal including information indicating a communication partner from terminal device 5 or some other device, control circuit 13 writes the actual address of the communication partner into storage unit 15, as information indicating the communication partner.

Power circuit 16 is, for example, a power supply that performs AC/DC conversion, and supplies power to each component included in luminaire 1.

Note that each of the plurality of luminaires 1 included in the lighting system illustrated in FIG. 1 may have the same specifications. Alternatively, the lighting system illustrated in FIG. 1 may include a plurality of luminaires 1 having different specifications.

Moreover, control circuit 13 may be implemented as a microcomputer including memory that stores a program and a microprocessor, and, alternatively, may be implemented as hardware including an analog circuit and a digital circuit.

(1.2 Wireless IF Device 2 Configuration Example)

Next, an example of a configuration of wireless IF device 2 will be given.

Figure 3:
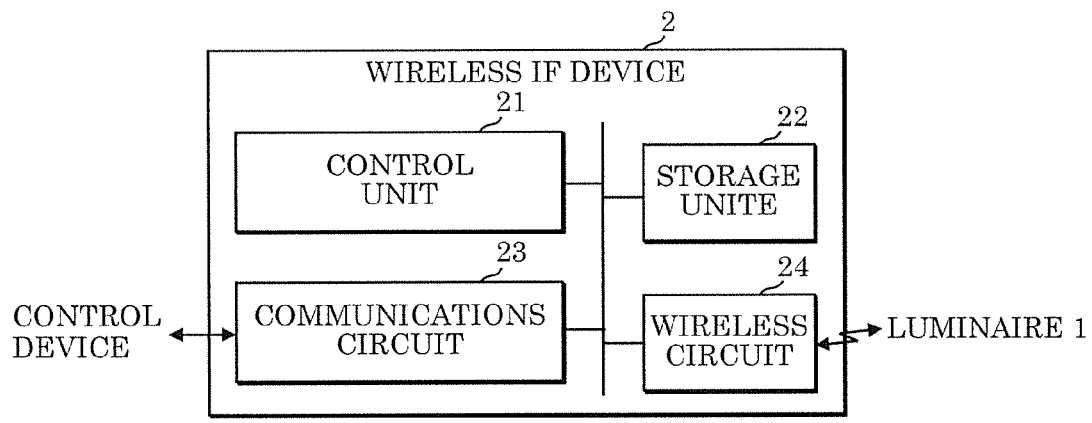
FIG. 3 illustrates an example of a configuration of a wireless IF device according to the embodiment.

FIG. 3 illustrates an example of a configuration of wireless IF device 2 according to the embodiment. As illustrated in FIG. 3, wireless IF device 2 includes control unit 21, storage unit 22, communications circuit 23, and wireless circuit 24.

Control unit 21 performs control for relaying control signals and response signals between controller 3 and luminaires 1.

Storage unit 22 is memory for storing actual addresses of luminaires 1 as information indicating communication partners.

Communications circuit 23 receives, from controller 3 via a wired communications path, control signals destined for luminaires 1, and transmits response signals to controller 3.

Wireless circuit 24 transmits control signals to luminaires 1 via wireless communications paths, and receives response signals from luminaires 1 via wireless communications paths.

Next, an example of how a control signal is handled in wireless IF device 2 will be given. In a control signal transmitted from controller 3 to communications circuit 23 via a wired communications path, the actual address of a luminaire 1 is set as the destination address and the actual address of controller 3 is set as the source address. A control signal received by communications circuit 23 from controller 3 is sent to control unit 21. When the destination address of the control signal from communications circuit 23 matches the actual address of a luminaire 1 stored in storage unit 22 as information indicating a communication partner, control unit 21 wirelessly transmits the control signal from wireless circuit 24 (that is, relays the control signal). Here, control unit 21 adds or overwrites the actual address of wireless IF device 2 as the source address of the control signal. In contrast, when the destination address of the control signal from communications circuit 23 does not match the actual address of a luminaire 1 stored in storage unit 22 as information indicating a communication partner, control unit 21 disregards or discards the control signal (i.e., does not relay the control signal).

Stated differently, among control signals received from controller 3, wireless IF device 2 relays a control signal addressed to a luminaire 1 paired with wireless IF device 2, to the luminaire 1.

Note that control unit 21 may be implemented as a microcomputer including memory that stores a program and a microprocessor, and, alternatively, may be implemented as hardware including an analog circuit and a digital circuit.

(1.3 Controller 3 Configuration Example)

Next, an example of a configuration of controller 3 will be given.

Figure 4:
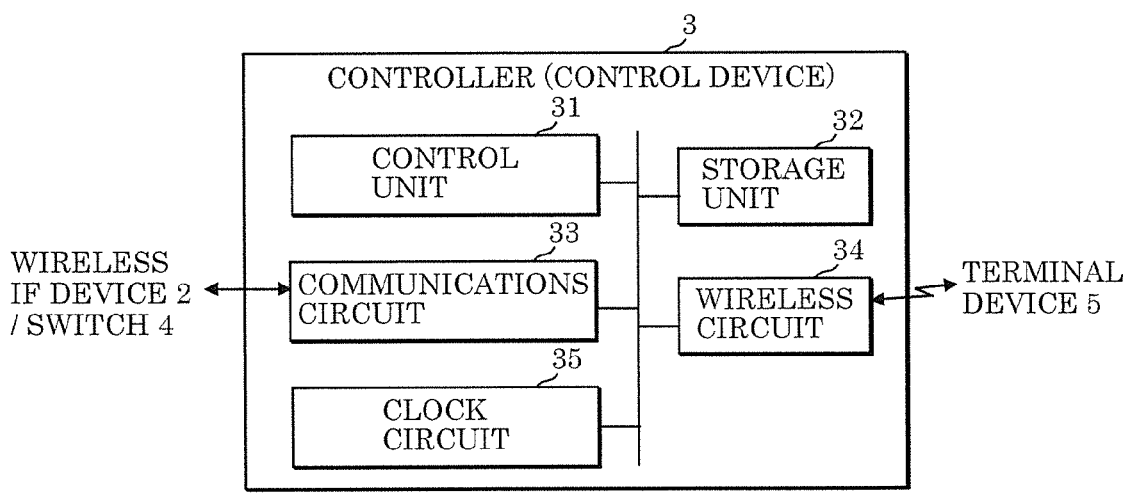
FIG. 4 illustrates an example of a configuration of a controller (control device) according to the embodiment.

FIG. 4 illustrates an example of a configuration of controller 3 according to the embodiment. As illustrated in FIG. 4, controller 3 includes control unit 31, storage unit 32, communications circuit 33, wireless circuit 34, and clock circuit 35. With this, controller 3 controls lighting operations performed by the plurality of luminaires 1 included in the lighting system.

Control unit 31 generates a control signal in accordance with an input made on switch panel 4 by the user or lighting schedule data and operational group data stored in storage unit 32, and causes communications circuit 33 to transmit the generated control signal to a wireless IF device 2 via a wired communications path.

Storage unit 32 stores lighting schedule data and operational group data. The lighting schedule data is data that defines a schedule for lighting operations, and associates times with lighting operations. The operational group data is data that defines operational groups of luminaires 1 that are to perform like lighting operations. The lighting schedule data can be defined on a per operational group basis.

Communications circuit 33 transmits control signals to wireless IF devices 2 via wired communications paths, and receives response signals from wireless IF devices 2 via wired communications paths. Furthermore, communications circuit 33 receives signals indicating that a user made an input on switch panel 4, from switch panel 4. Examples of inputs made by a user include turning on any switch, turning off any switch, and adjusting the dimming knob.

Wireless circuit 34 receives control signals from terminal device 5. These control signals are, for example, signals including lighting schedule data or operational group data. The lighting schedule data and the operational group data are generated in accordance with an input made by a user via terminal device 5 or some other device. The lighting schedule data or operational group data are written into storage unit 32 based on control signals received by wireless circuit 34.

Clock circuit 35 counts time. The time is referenced by control unit 31 for performing control in accordance with the lighting schedule data.

Note that control unit 31 may be implemented as a microcomputer including memory that stores a program and a microprocessor, and, alternatively, may be implemented as hardware including an analog circuit and a digital circuit.

(1.4 Terminal Device 5 Configuration Example)

Next, an example of a configuration of terminal device 5 will be given. Terminal device 5 is a pairing device that executes a pairing method for use in a lighting system including a plurality of wireless IF devices 2 that wirelessly transmit a control signal and a plurality of luminaires 1 that receive the control signal, to determine communication partners among the plurality of luminaires 1 and the plurality of wireless IF devices 2.

Figure 5:
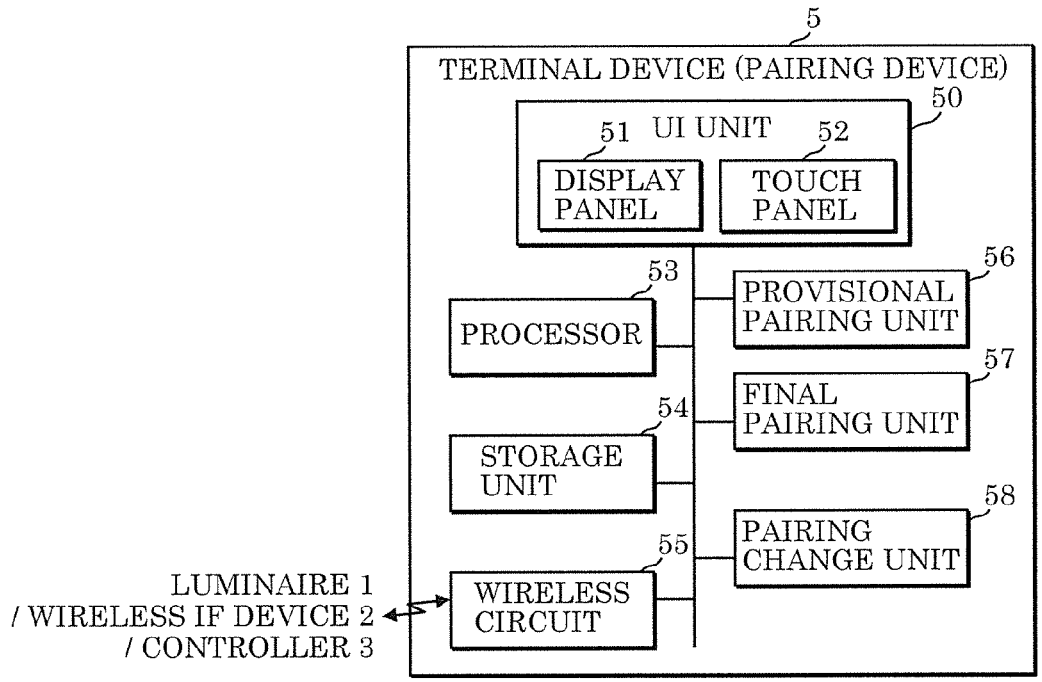
FIG. 5 illustrates an example of a configuration of a terminal device according to the embodiment.

FIG. 5 illustrates an example of a configuration of terminal device 5 according to the embodiment. As illustrated in FIG. 5, terminal device 5 includes user interface (UI) unit 50, processor 53, storage unit 54, wireless circuit 55, provisional pairing unit 56, final pairing unit 57, and pairing changing unit 58.

UI unit 50 includes display panel 51 (one example of the display) and touch panel 52.

Processor 53 executes various programs stored in storage unit 54.

Storage unit 54 stores various programs to be executed by processor 53, and stores various data referenced or generated by processor 53. Note that storage unit 54 includes primary memory, secondary memory, auxiliary memory, and cache memory.

Wireless circuit 55 wirelessly communicates with luminaires 1, wireless IF device 2, and controller 3 via wireless communications paths.

In the design phase of the lighting system, provisional pairing unit 56 generates provisional pairing data by obtaining a layout map indicating a layout of the plurality of luminaires 1 and the plurality of wireless IF devices 2, assigning provisional addresses to the plurality of luminaires 1 and the plurality of wireless IF devices 2 indicated on the layout map, and associating the provisional addresses assigned to the plurality of wireless IF devices 2 with the provisional addresses assigned to the plurality of luminaires 1 in a one-to-many relationship. In the design phase of the lighting system, more often than not, the actual luminaires 1 and wireless IF devices 2 are not yet installed in the building, or the actual luminaires 1 and wireless IF devices 2 are not yet specified or not yet provided. In such cases, the actual addresses of luminaires 1 and wireless IF devices 2 are unknown, so it is impossible to perform pairing using actual addresses. Provisional pairing unit 56 therefore performs provisional pairing on a blueprint in the design phase, using provisional addresses as placeholders for actual addresses.

In the installation phase in which the plurality of luminaires 1 and the plurality of wireless IF devices 2 have been installed according to the layout map, final pairing unit 57 generates final pairing data by associating the provisional addresses in the provisional pairing data with actual addresses. Thereafter, terminal device 5 notifies the plurality of luminaires 1 and the plurality of wireless IF devices 2 of each of the actual addresses each is associated with in the final pairing data, and causes the plurality of luminaires 1 and the plurality of wireless IF devices 2 to store, as an actual address of a communication partner, each of the notified actual addresses.

Pairing changing unit 58 changes the final pairing data so that when a change is made to an operational group, the group of luminaires paired with the same wireless IF device matches the changed operational group.

Note that provisional pairing unit 56 may be realized by processor 53 executing a provisional pairing program stored in storage unit 54. In such cases, provisional pairing unit 56 would be illustrated in FIG. 5 as a functional block realized by processor 53 executing a program. Alternatively, provisional pairing unit 56 may be realized via hardware including a microcomputer. In such cases, provisional pairing unit 56 would be illustrated in FIG. 5 as a hardware block.

Moreover, final pairing unit 57 may be realized by processor 53 executing a final pairing program stored in storage unit 54. In such cases, final pairing unit 57 would be illustrated in FIG. 5 as a functional block realized by processor 53 executing a program. Alternatively, final pairing unit 57 may be realized via hardware including a microcomputer. In such cases, final pairing unit 57 would be illustrated in FIG. 5 as a hardware block.

Furthermore, pairing changing unit 58 may be realized by processor 53 executing a pairing change program stored in storage unit 54. In such cases, pairing changing unit 58 would be illustrated in FIG. 5 as a functional block realized by processor 53 executing a program. Alternatively, pairing changing unit 58 may be realized via hardware including a microcomputer. In such cases, pairing changing unit 58 would be illustrated in FIG. 5 as a hardware block.

Although terminal device 5 is exemplified in FIG. 5 as having a configuration based on a tablet terminal device, terminal device 5 may have a configuration based on a notebook computer, desktop computer, or smartphone.

(1.5. Example of Content Stored in Storage Unit 54)

Next, regarding the pairing method executed by terminal device 5, examples of the various programs and various data stored in storage unit 54 will be given.

Figure 6:
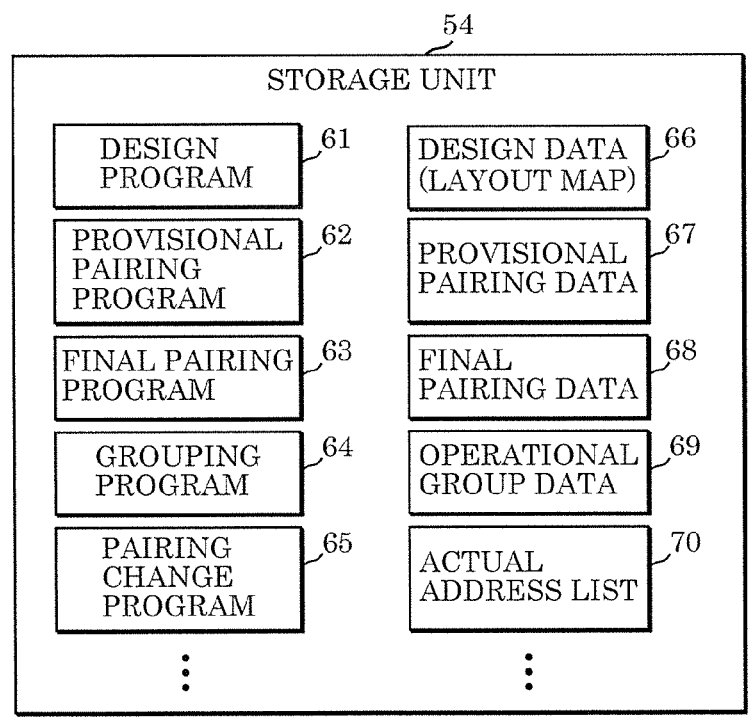
FIG. 6 illustrates an example of content stored in a storage unit in the terminal device according to the embodiment.

FIG. 6 illustrates an example of content stored in storage unit 54 in terminal device 5 according to the embodiment. Storage unit 54 illustrated in FIG. 6 stores, as the various programs to be executed by processor 53, for example, design program 61, provisional pairing program 62, final pairing program 63, grouping program 64, pairing change program 65. Storage unit 54 also stores, as the various data to be referenced or generated by processor 53, for example, design data 66, provisional pairing data 67, final pairing data 68, operational group data 69, and actual address list 70.

Design program 61 is a program for designing how to arrange the lighting system in a target building, and is a program for designing the layout of mainly the plurality of luminaires 1 and the plurality of wireless IF devices 2. For example, design program 61 includes a calculation program that calculates the illuminance distribution for the layout of the plurality of luminaires 1, and makes it easier to determine a layout that achieves a suitable illuminance distribution. Design data 66 is generated as a product resulting from design program 61 being executed. Design data 66 includes a layout map indicating a layout of the plurality of luminaires 1 and the plurality of wireless IF devices 2 in the target building. Note that the layout map may include data indicating the shapes and positions of structural components of the target building for the lighting system, such as the floor, ceiling, pillars, walls, etc.

Provisional pairing program 62 is a program for generating provisional pairing data 67 by assigning provisional addresses to the plurality of luminaires 1 and the plurality of wireless IF devices 2 indicated on the layout map in design data 66, and associating the provisional addresses assigned to the plurality of wireless IF devices 2 with the provisional addresses assigned to the plurality of luminaires 1 in a one-to-many relationship.

Final pairing program 63 is a program that, in the installation phase in which the plurality of luminaires 1 and the plurality of wireless IF devices 2 have been installed according to the layout map, generates final pairing data 68 by associating the provisional addresses in the provisional pairing data with actual addresses.

Grouping program 64 is a program for generating operational group data 69 by dividing the plurality of luminaires 1 in to operational groups of luminaires 1 that are to perform like lighting operations.

Pairing change program 65 is a program for changing the final pairing data so that when a change is made to an operational group, the group of luminaires paired with the same wireless IF device matches the changed operational group.

Actual address list 70 is data indicating a list of actual addresses of the plurality of luminaires 1 and the plurality of wireless IF devices 2 included in the lighting system. Actual address list 70 is generated as a result of terminal device 5, for example, broadcasting a control signal requesting actual addresses immediately after the plurality of actual luminaires 1 and the plurality of actual wireless IF devices 2 included in the lighting system are installed in the building, and terminal device 5 receiving responses to the requests.

(2. Lighting System Construction and Pairing Method Executed by Terminal Device 5)

Next, the flow for constructing the lighting system described above and the pairing method executed by terminal device 5 will be described.

Figure 7:
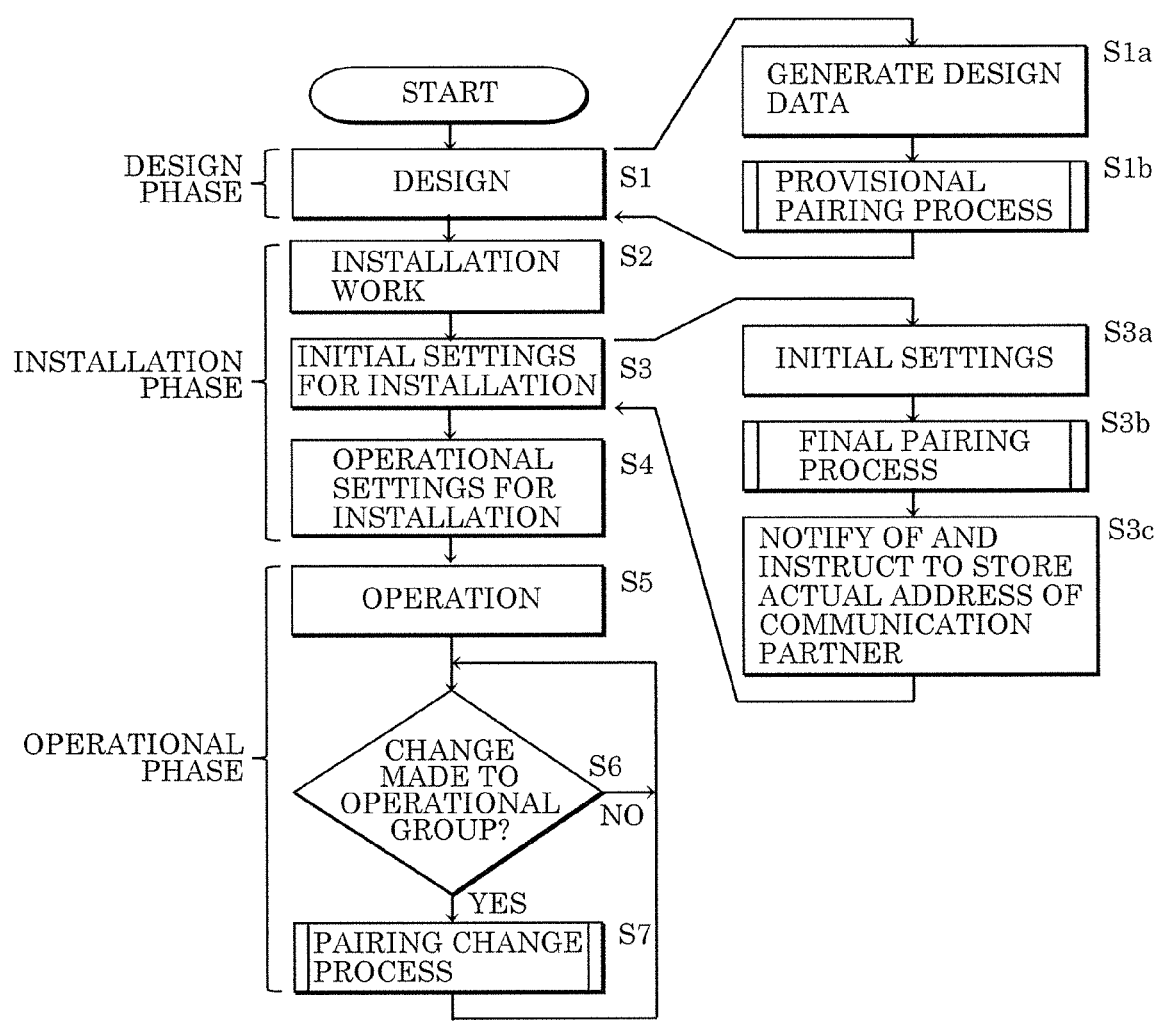
FIG. 7 is a flow chart including an example of the flow of constructing the lighting system according to the embodiment, from the design phase to the operational phase, and an example of the pairing method executed by terminal device 5.

FIG. 7 is a flow chart including an example of the flow of constructing the lighting system according to the embodiment, from the design phase to the operational phase, and an example of the pairing method executed by terminal device 5. FIG. 7 illustrates the flow for constructing the lighting system in a target building, from the design phase to the operational phase. FIG. 7 includes steps that use terminal device 5 or some other device, as well as steps performed by hand. As illustrated in FIG. 7, the lighting system goes through a design phase (S1), an installation phase (S2 through S3), and an operational phase (S5 through S7). Moreover, the pairing method executed by terminal device 5 includes the provisional pairing process (S1b) and the final pairing process (S3b) illustrated in FIG. 7.

In step S1 (designing of the lighting system), design data is generated (S1a), and the provisional pairing process is performed (S1b).

More specifically, step S1a (generating design data) is performed by terminal device 5 executing design program 61. In other words, in accordance with inputs made by a user, terminal device 5 designs a layout for the plurality of luminaires 1 and the plurality of wireless IF devices 2 included in the lighting system in a target building (for example, a room, one or more floors of a building, a store, factory, etc), and generates design data including the layout map.

Furthermore, step S1b (provisional pairing process) is performed by terminal device 5 executing provisional pairing program 62. In other words, in accordance with inputs made by a user, terminal device 5 generates provisional pairing data 67 by assigning provisional addresses to the plurality of luminaires 1 and the plurality of wireless IF devices 2 in the layout map, and associating the provisional addresses assigned to the plurality of wireless IF devices 2 with the provisional addresses assigned to the plurality of luminaires 1 in a one-to-many relationship. The provisional pairing process can be executed even if the plurality of actual luminaires 1 and the plurality of actual wireless IF devices 2 are not provided (that is to say, even if the actual addresses thereof are unknown). This greatly reduces the time and work required for the subsequent final pairing process.

In the installation phase of the lighting system, installation work (S2) is performed, initial settings for the installation are made (S3), and operational settings for the installation are made (S4).

More specifically, in step S2 (installation work), the plurality of actual luminaires 1 and the plurality of actual wireless IF devices 2 are installed in the target building. In this phase, since the plurality of actual luminaires 1 and the plurality of actual wireless IF devices 2 are provided, the actual addresses of the plurality of luminaires 1 and the plurality of wireless IF devices 2 are definitively available.

In the next step, step S3 (initial settings for the installation), terminal device 5 obtains design data 66 including the layout map and provisional pairing data 67 (S3a), performs a final pairing process by executing final pairing program 63 (S3b), and notifies and causes each of the plurality of luminaires 1 and the plurality of wireless IF devices 2 to store the actual address of each communication partner (S3c). This enables communication between paired partners.

More specifically, in step S3a (initial settings), when terminal device 5 used in step S1 and terminal device 5 used in step S3 are two different devices, data required to make initial settings for installation (i.e., design data 66 and provisional pairing data 67) is downloaded. If terminal device 5 used in step S1 and terminal device 5 used in step S3 are the same device, step S3a may be omitted.

In the next step, step S3b (final pairing process), final pairing data 68 is generated by associating the provisional addresses in provisional pairing data 67 with actual addresses. The actual addresses of the plurality of luminaires 1 and the plurality of wireless IF devices 2 are obtained by, for example, terminal device 5 wirelessly broadcasting control signals requesting the actual addresses and then receiving responses to the requests. In the final pairing process, the process of associating luminaires 1 with wireless IF devices 2 is not necessary; it is sufficient if the provisional addresses are associated with, or overwritten with, actual addresses. This makes it possible to reduce the time and work required to perform pairing (final pairing process) in the installation phase.

Furthermore, in step S3c (actual address notification), the plurality of luminaires 1 and the plurality of wireless IF devices 2 are notified of each the actual addresses each is associated with in final pairing data 68, and caused to store, as an actual addresses of a communication partner, each of the notified actual addresses.

In the operational phase of the lighting system, operational settings for the installation are made (S4), the lighting system is put into operation (S5), and a pairing change process (S7) is performed when a change is made to an operational group (YES in S6).

More specifically, in step S4 (operational settings for installation), for example, settings for the operational groups are made, settings for the lighting schedule data are made, and associations between switch panel 4 and the operational groups are made. The steps up to the operational settings are typically performed by the installer. After completion of the operational settings, the installer hands over the lighting system to the user (operator) of the lighting system, such as the owner of the target building. With this, the lighting system is in a state that is operable by the user (operator) of the lighting system.

In the next step, step S5 (operation), daily operation of the lighting system is carried out by controller 3 controlling lighting operations in accordance with the operational group data and the lighting schedule data. Additionally, daily operation of the lighting system is carried out by a user making inputs via switch panel 4.

In step S6 (determining whether an operational group has been changed or not), it is determined whether a change has been made to an operational group of luminaires 1 that are to perform like lighting operations, that is to say, whether luminaires 1 have been added to or removed from an operational group. For example, after operation, when there is a change in the layout of, for example, the store in which the lighting system is installed in, there are instances when there are also changes to an operational group. When there is a change in an operational group, the changed operational group and the group of luminaires 1 paired with the same wireless IF device 2 become mismatched.

In order to fix this mismatch, in step S7 (pairing change process), the final pairing data is changed so that the group of luminaires paired with the same wireless IF device matches the changed operational group. This fixes the mismatch described above. As a result, simultaneity of lighting operations among luminaires 1 belonging to the changed operational group can be guaranteed. Stated differently, it is possible to inhibit occurrence of delays in lighting operations (turning on/off lights, etc.) performed by some luminaires 1 in the changed operational group.

In step S6, instead of determining whether a change has been made to an operational group, whether or not the group of luminaires 1 paired with the same wireless IF device 2 matches the operational group may be determined.

(2.1 Detailed Example of Pairing Method)

Next, a detailed example of the pairing method executed by terminal device 5 will be given with reference to a flowchart figure and a figure illustrating an example of various data.

The pairing method executed by terminal device 5 includes the provisional pairing process and final pairing process illustrated in FIG. 7.

(2.2 Detailed Example of Provisional Pairing Process)

Figure 8:
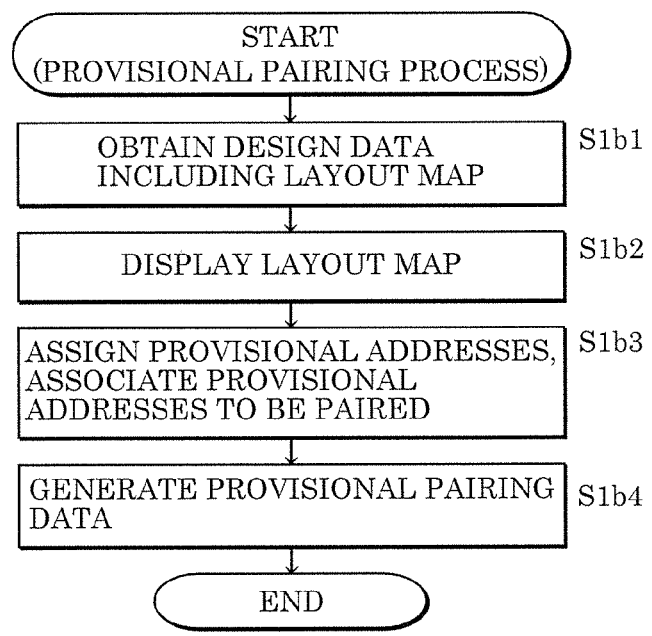
FIG. 8 is a flow chart illustrating a more detailed example of the process in step S1$b$ (provisional pairing process) in FIG. 7.
Figure 9:
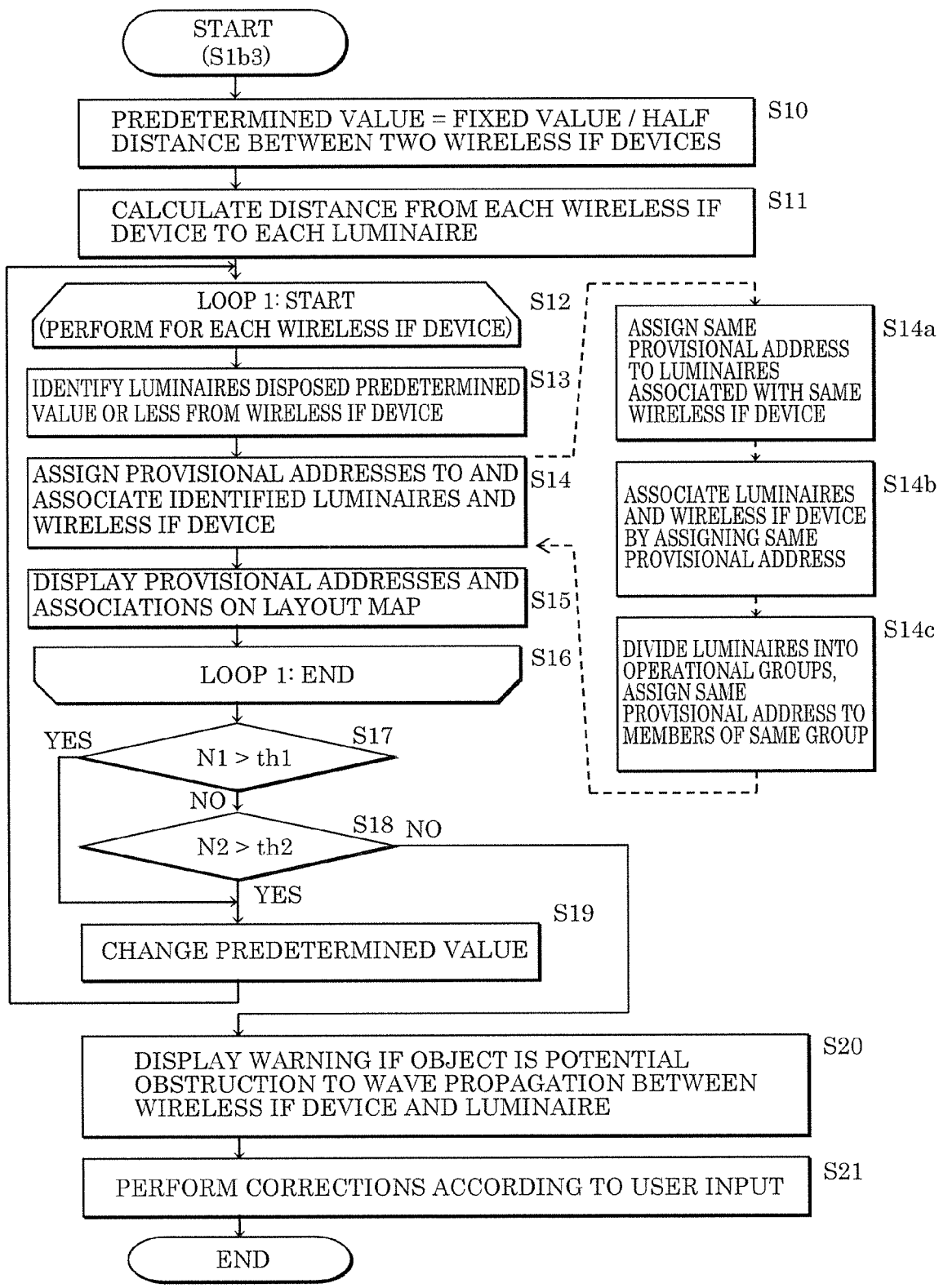
FIG. 9 is a flow chart illustrating a more detailed example of the process in step S1$b$3 (provisional address association) in FIG. 8.

First, the example of the provisional pairing process illustrated in FIG. 8 will be described. FIG. 8 is a flow chart illustrating a more detailed example of the process in step S1b (provisional pairing process) in FIG. 7. FIG. 9 is a flow chart illustrating a more detailed example of the process in step S1b3 (provisional address association) in FIG. 8.

As illustrated in FIG. 8, terminal device 5 obtains design data 66 including a layout map indicating a layout of the plurality of luminaires 1 and the plurality of wireless IF devices 2 (S1b1). FIG. 12 illustrates one example of design data 66 stored in storage unit 54 of terminal device 5 according to the embodiment. Design data 66 illustrated in FIG. 12 includes data indicating, for example, the model number, coordinates, dimensions, and illuminance of each luminaire 1. Terminal device 5 specifies the specifications (dimensions, illuminance, etc.) of luminaires 1 depending on model number. The coordinates indicate the positions of luminaires 1. For example, the ceiling of the building defines the XY plane, and the Z axis extends perpendicular to the ceiling. Design data 66 is also data indicating a layout map. Note that design data 66 includes data indicating the model number, coordinates, dimensions, etc., of each wireless IF device 2, the controller 3, and the switch panel 4.

Figure 13:
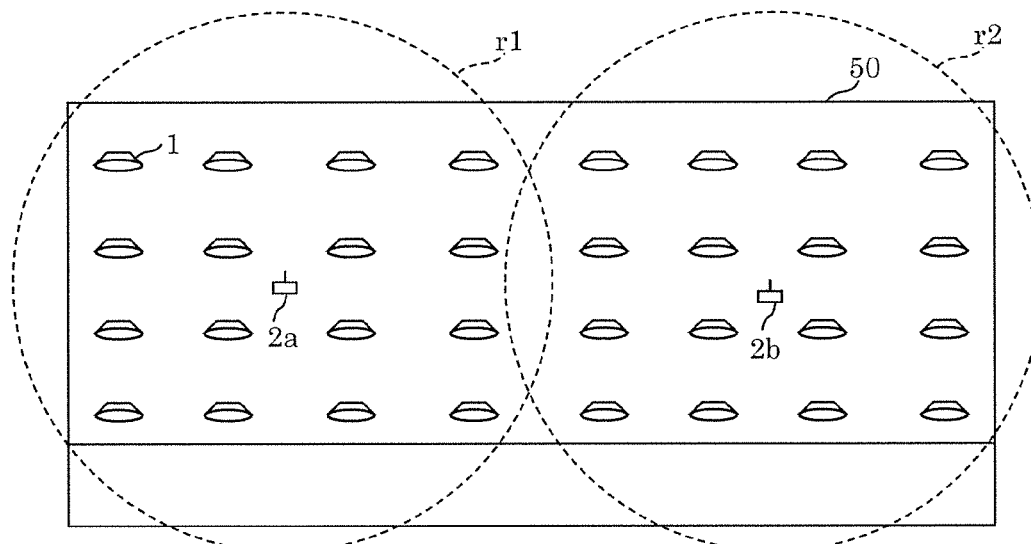
FIG. 13 illustrates an example of a display of a layout map on a UI unit of the terminal device according to the embodiment.

Next, terminal device 5 displays the layout map on display panel 51 (S1b2). For example, terminal device 5 renders the layout map on display panel 51 as indicated by design data 66. Alternatively, terminal device 5 renders the layout map on display panel 51 as indicated by layout map data generated in advance based on design data 66. FIG. 13 illustrates an example of a display of the layout map on UI unit 50 of terminal device 5 according to the embodiment. FIG. 13 shows, in roughly the top ⅘-ths of display panel 51 of UI unit 50, 32 icons indicating luminaires 1 and two icons indicating wireless IF devices 2. Terminal device 5 displays such a layout map, and is capable of receiving various inputs from the user with respect to the luminaire 1 icons and the wireless IF device 2 icons.

Furthermore, terminal device 5 generates provisional pairing data by assigning provisional addresses to the plurality of luminaires 1 and the plurality of wireless IF devices 2 indicated on the layout map, and associating the provisional addresses assigned to the plurality of wireless IF devices 2 with the provisional addresses assigned to the plurality of luminaires 1 in a one-to-many relationship (S1*b*3).

In the assigning and associating of the provisional addresses, terminal device 5 (1) may perform the provisional pairing process primarily manually by receiving inputs made by the user on the layout map or (2) may perform the provisional pairing process primarily automatically. Terminal device 5 or the user may, as the provisional pairing process, for example, select (1) when there are only a few luminaires 1 on the layout map and may select (2) when there are many luminaires 1 on the layout map.

Figure 14:
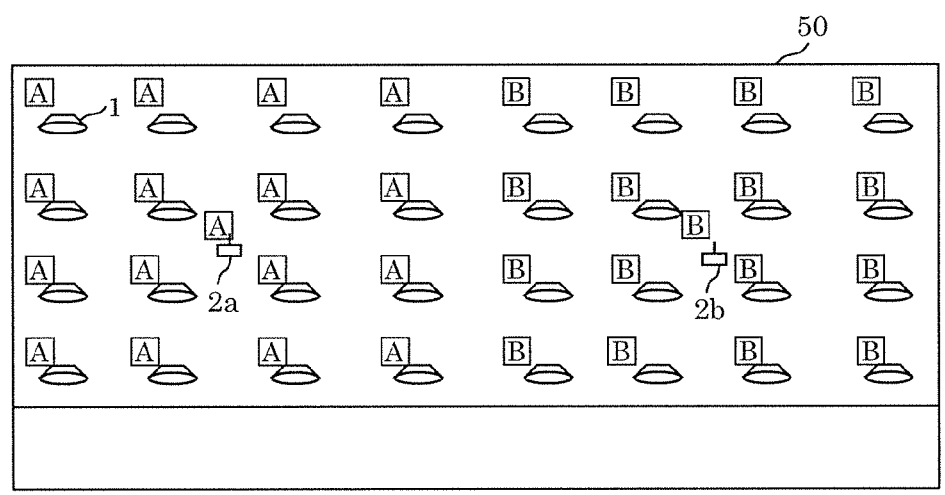
FIG. 14 illustrates an example of how the layout map is displayed when assigned provisional addresses are added on the layout map illustrated in FIG. 13.

FIG. 14 illustrates an example of how the layout map is displayed when assigned provisional addresses are added on the layout map illustrated in FIG. 13. In FIG. 14, the rectangle boxes with A and B in them displayed at the top left of the icons for luminaires 1 and wireless IF devices 2 indicate the assigned provisional addresses. In FIG. 14, the same provisional address is assigned to a plurality of luminaires 1. The provisional addresses need not be different for luminaires 1 and wireless IF devices 2; so long as the provisional addresses indicate communication partners to be paired, a provisional name to be temporarily assigned may be used. In particular, in FIG. 14, the plurality of luminaires 1 associated with the same wireless IF device 2 are assigned with the same provisional address. Moreover, the plurality of luminaires 1 and the wireless IF device 2 associated via pairing are assigned with the same provisional address. Stated differently, icons for the 16 luminaires 1 on the left side of FIG. 14 and the icon for wireless IF device 2 on the left side of FIG. 14 are assigned with the same provisional address "A". In other words, the left 16 luminaires 1 are each associated with the left wireless IF device 2 as a communication partner. Moreover, icons for the 16 luminaires 1 on the right side of FIG. 14 and the icon for wireless IF device 2 on the right side of FIG. 14 are assigned with the same provisional address "B". In other words, the right 16 luminaires 1 are each associated with the right wireless IF device 2 as a communication partner.

Next, an example for the case described in (2) above, that is to say, an example of processes performed when terminal device 5 performs the provisional pairing process primarily automatically, will be described with reference to FIG. 9. In FIG. 9, terminal device 5 first determines the predetermined value (S10). The predetermined value indicates a distance within which wireless communication is possible via wireless IF device 2. For example, the predetermined value is a fixed value or is half the distance between the two wireless IF devices 2 on the layout map. The predetermined value may be determined individually for each wireless IF device 2.

Terminal device 5 then calculates the distance from each wireless IF device 2 to each luminaire 1 on the layout map (S11), and executes loop 1 (S12 through S16) including processes that are repeated for each wireless IF device 2.

In loop 1, terminal device 5 identifies a luminaire 1 whose distance to a wireless IF device 2 is less than or equal to the predetermined value (S13), assigns a provisional address to the identified luminaire 1 and wireless IF device 2, and associates the identified luminaire 1 and wireless IF device 2 (S14). For example, dashed line r1 in FIG. 13 indicates a circle whose radius defined by the predetermined value from the left wireless IF device 2 as the center of the circle. Luminaires 1 inside dashed line r1 are associated with the left wireless IF device 2. Dashed line r2 in FIG. 13 indicates a circle whose radius is defined by the predetermined value from the right wireless IF device 2 as the center of the circle. Luminaires 1 inside dashed line r2 are associated with the right wireless IF device 2.

Terminal device 5 further displays the provisional addresses and associations on the layout map (S15).

In step S14, provisional addresses may be individually assigned to the plurality of luminaires 1 and the plurality of wireless IF devices 2, and, alternatively, the same provisional address may be assigned as shown in steps S14*a* through S14*c* on the right side of FIG. 9.

Next, the former case, that is to say, when the same provisional address is assigned, will be described. Terminal device 5 assigns the same provisional address to the plurality of luminaires 1 identified in step S13, that is to say, to the plurality of luminaires 1 associated with the same wireless IF device 2 (S14*a*), and further generates provisional pairing data 67 by assigning the same provisional address to those luminaires 1 and that wireless IF device 2 to associate them (S14*b*).

Terminal device 5 further divides the plurality of luminaires 1 into operational groups and assigns the same provisional address to members of the same operational group (S14*c*). In step S14*c*, the operational groups are determined so as to be the same as the groups of luminaires paired with the same wireless IF device.

With this, in step S15, for example, the same result as in FIG. 14 is obtained.

After the processing in loop 1 has been performed for each wireless IF device 2, terminal device 5 detects the number N1 of luminaires 1 that are redundantly associated with two or more wireless IF devices 2, determines whether number N1 is greater than threshold th1 or not (S17), and when number N1 is determined to be greater than threshold th1, updates the predetermined value (S19), and repeats loop 1 again.

When number N1 is determined to be no greater than threshold th1, terminal device 5 further detects the number N2 of luminaires 1 not associated with a wireless IF device 2, determines whether number N2 is greater than threshold th2 or not (S18), and when number N2 is determined to be greater than threshold th2, updates the predetermined value (S19), and repeats loop 1 again.

Note that threshold th1 may be defined as a percentage (for example, 1%, 3%, 5%, . . . , etc.) of the total number of plurality of luminaires 1. Threshold th2 may be defined in the same manner. Moreover, threshold th1 and threshold th2 may be different values, or the same value.

When number N2 is determined to be no greater than threshold th2 in step S18, terminal device 5 further displays a warning on the layout map indicating that there is an object between the wireless IF device 2 and the luminaire 1 that may obstruct wave propagation (S20). For example, if a pillar, wall, ceiling, or floor intersect a virtual line connecting the wireless IF device 2 and the luminaire 1, terminal device 5 determines that there is an object that may obstruct wave propagation, and displays a warning. Thereafter, terminal device 5 assigns provisional addresses in accordance with an input made by a user, and if there is an insufficiency regarding the association, fixes the insufficiency (S21).

Next, an example of provisional pairing data 67 corresponding to FIG. 14 will be given. Here, provisional pairing data 67 is exemplified as including provisional pairing data 67a for luminaires 1 and provisional pairing data 67b for wireless IF devices 2.

FIG. 15 illustrates an example of provisional pairing data 67a for luminaires 1 generated by the pairing method according to the embodiment. Provisional pairing data 67a illustrated in FIG. 15 includes, for each luminaire 1, coordinates indicating the position of the luminaire 1, the provisional address of the luminaire 1, and the provisional address of the wireless IF device 2 functioning as the communication partner.

FIG. 16 illustrates an example of provisional pairing data 67b for wireless IF devices 2 generated by the pairing method according to the embodiment. Provisional pairing data 67b illustrated in FIG. 16 includes, for each wireless IF device 2, coordinates indicating the position of the wireless IF device 2, the provisional address of the wireless IF device 2, and the provisional addresses of luminaires 1 functioning as communication partners.

(2.3 Detailed Example of Final Pairing Process)

Figure 10:
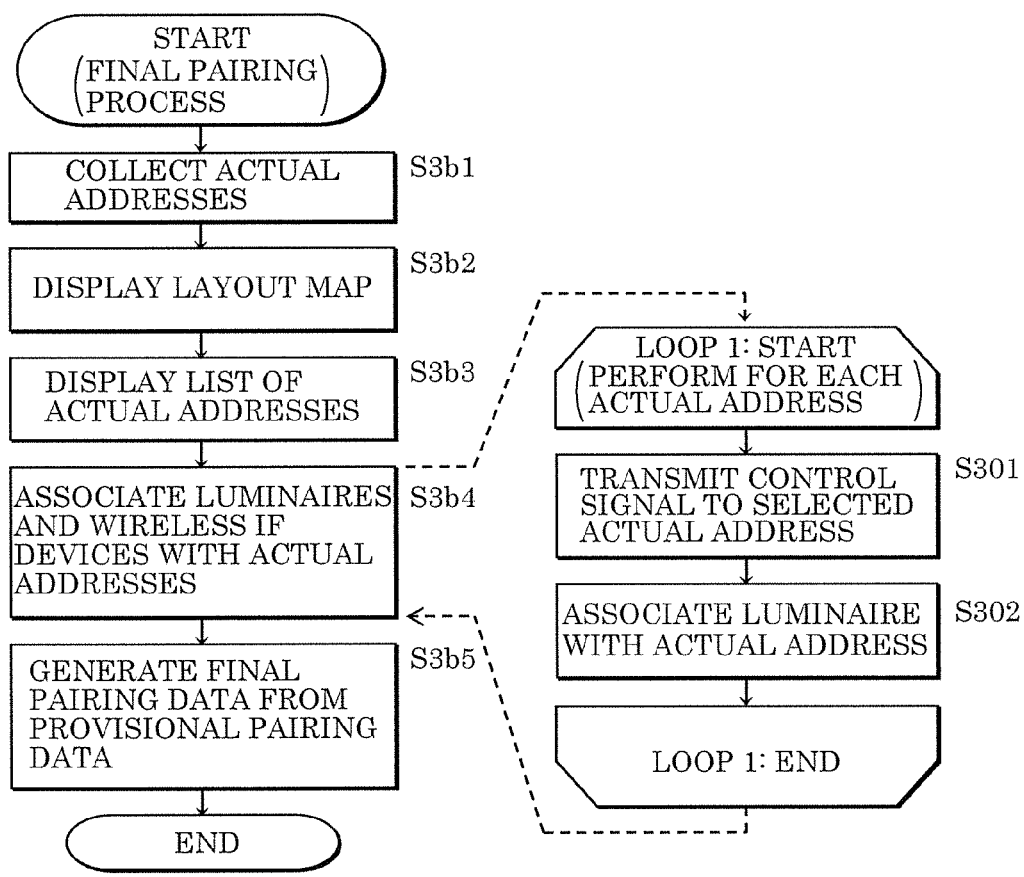
FIG. 10 is a flow chart illustrating a more detailed example of the process in step S3$b$ (final pairing process) in FIG. 7.

Next, an example of the final pairing process will be described in detail. FIG. 10 is a flow chart illustrating a more detailed example of the process in step S3b (final pairing process) in FIG. 7.

As illustrated in FIG. 10, after step 3a, terminal device 5 collects actual addresses from all luminaires 1 and all wireless IF devices 2 included in the lighting system (S3b1), and generates actual address list 70. For example, after the actual luminaires 1 and wireless IF devices 2 included in the lighting system are installed in a building, terminal device 5, for example, wirelessly broadcasts a control signal requesting actual addresses, and collects the actual addresses by receiving responses.

Figure 17:
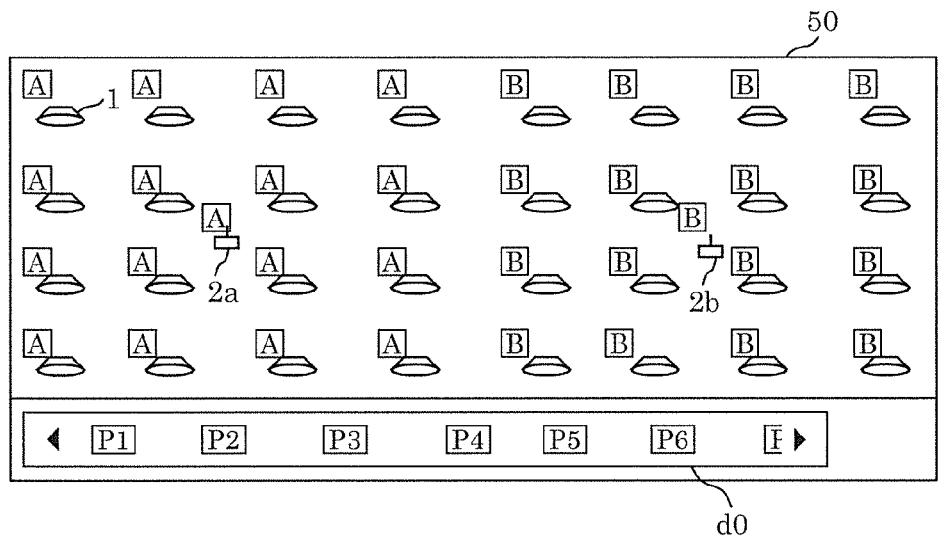
FIG. 17 corresponds to the display example illustrated in FIG. 14, and illustrates an example of how the list of collected actual addresses is displayed.

Terminal device 5 further displays the layout map including the associated provisional addresses on UI unit 50 (S3b2), and displays a list of the collected actual addresses (S3b3). FIG. 17 corresponds to the display example illustrated in FIG. 14, and illustrates an example of how the list of collected actual addresses is displayed. In FIG. 17, in display region d0, which is located in the display frame and occupies roughly the bottom ⅕-th of the display region of UI unit 50, the list of actual addresses is displayed in a manner that is horizontally scrollable. P1, P2, etc., in FIG. 17 indicate actual addresses, and the rectangular boxes enclosing P1, P2, etc., are icons indicating actual addresses.

Next, terminal device 5 associates the actual addresses with the luminaires and the wireless IF devices on the layout map, in accordance with user input (S3b4).

Figure 18:
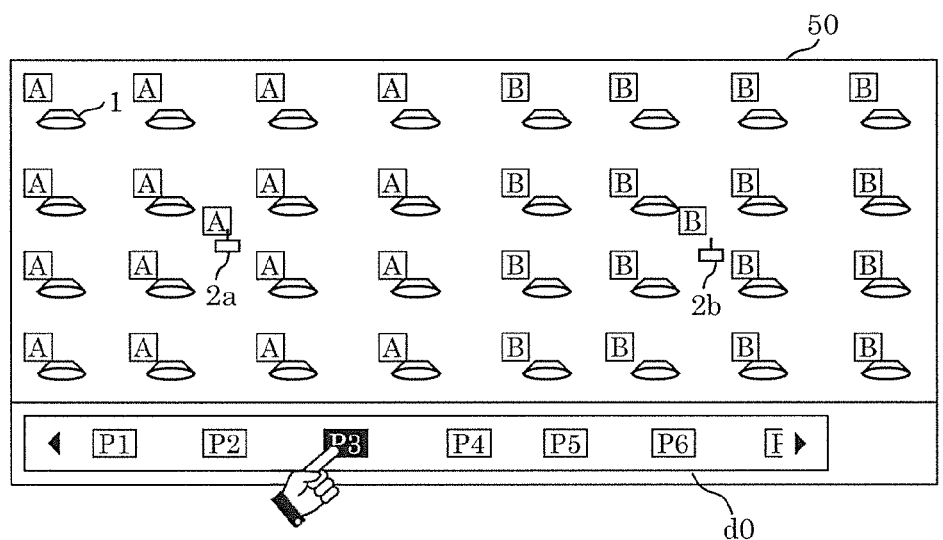
FIG. 18 illustrates a touch input for selecting one actual address icon on the display illustrated in FIG. 17.
Figure 19:
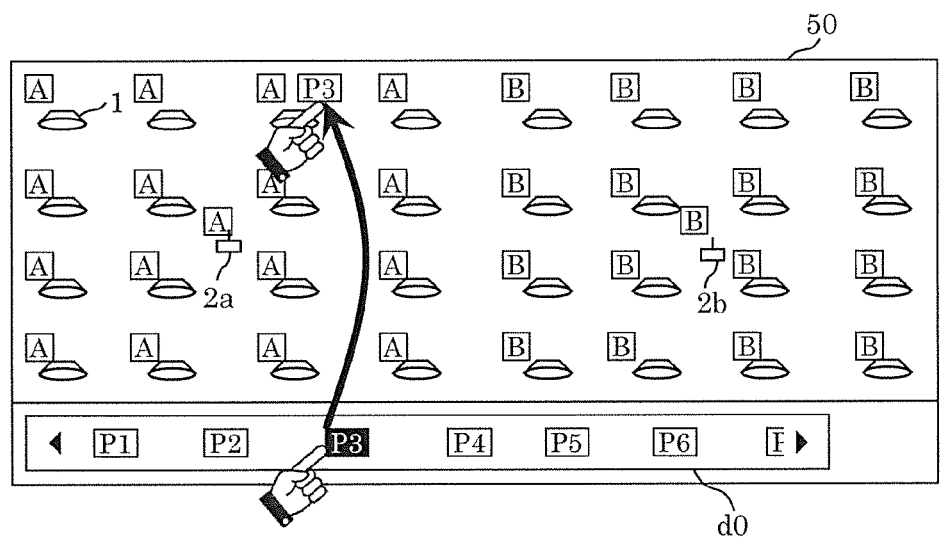
FIG. 19 illustrates the user performing a drag-and-drop action to associate the selected actual address icon with a luminaire icon in FIG. 18.

This association may be performed via the processes in loop 1 illustrated in FIG. 10. The processes in loop 1 will be described with reference to FIG. 18 and FIG. 19. FIG. 18 illustrates a touch input for selecting one actual address icon on the display illustrated in FIG. 17. In FIG. 18, the actual address icon P3 is selected. When an actual address icon is selected, terminal device 5, transmits a control signal that is addressed to the actual address indicated by the selected actual address icon and instructs, for example, the device corresponding to the actual address to blink (S301). For example, terminal device 5 may repeatedly and alternately transmit control signals instructing the device to emit light and instructing the device to stop emitting light. This causes luminaire 1 corresponding to the actual address of P3 to blink. This allows the user to visually confirm the installation location of the actual luminaire 1 that is blinking from among the plurality of installed luminaires 1, and easily specify which luminaire 1 corresponds to the actual address P3 on the layout map. Terminal device 5 further associates the selected actual address with the luminaire 1 specified via user input (S302). FIG. 19 illustrates the user performing a drag-and-drop action to associate the selected actual address icon with a luminaire 1 icon in FIG. 18. In FIG. 19, the icon for the topmost luminaire 1 that is 3 spots over from the left on the layout map corresponds to the actual luminaire 1 caused to blink in step 301. In FIG. 19, as a result of the icon for actual address P3 selected by the user being dragged and dropped to the icon for the topmost luminaire 1 that is 3 spots over from the left on the layout map, terminal device 5 associates the actual address of P3 with that luminaire 1. In FIG. 19, the icon for the actual address of P3 is additionally displayed at the top right corner of the luminaire 1 icon.

Figure 20:
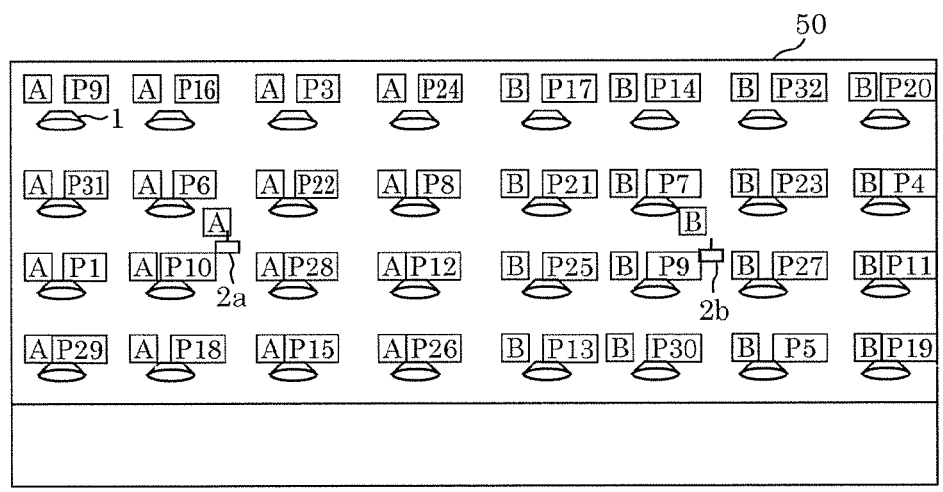
FIG. 20 illustrates FIG. 19 in a state in which the (icons for the) luminaires are associated with the (icons for the) actual addresses.

Via step S3b4, all luminaires 1 and wireless IF devices 2 on the layout map are associated with their actual addresses. FIG. 20 illustrates FIG. 19 in a state in which the (icons for the) luminaires are associated with the (icons for the) actual addresses. The actual address icons are additionally displayed at the top right corners of all luminaires 1 and wireless IF devices 2.

After completion of step S3b4, terminal device 5 generates final pairing data 68 from provisional pairing data 67 (S3b5).

Next, an example of final pairing data 68 corresponding to FIG. 20 will be given. Here, final pairing data 68 is exemplified as including final pairing data 68a for luminaires 1 and final pairing data 68b for wireless IF devices 2.

FIG. 21 illustrates an example of final pairing data 68a for luminaires 1 generated by the pairing method according to the embodiment. Final pairing data 68a illustrated in FIG. 21 includes, for each luminaire 1, coordinates indicating the position of the luminaire 1, the provisional address of the luminaire 1, the actual address of the luminaire 1, the provisional address of the wireless IF device 2 functioning as the communication partner, and the actual address of the wireless IF device 2 functioning as the communication partner. Note that final pairing data 68a for luminaires 1 need not include the provisional addresses of luminaires 1, and need not include the provisional address of the wireless IF device 2 functioning as the communication partner.

FIG. 22 illustrates an example of final pairing data 68b for wireless IF devices 2 generated by the pairing method according to the embodiment. Final pairing data 68b illustrated in FIG. 22 includes, for each wireless IF device 2, coordinates indicating the position of the wireless IF device 2, the provisional address of the wireless IF device 2, the actual address of the wireless IF device 2, the provisional addresses of luminaires 1 functioning as communication partners, and the actual addresses of luminaires 1 functioning as communication partners. Note that final pairing data 68b for wireless IF devices 2 need not include the provisional addresses of wireless IF devices 2, and need not include the provisional address of luminaires 1 functioning as communication partners.

After the final pairing process, as previously described in step S3c illustrated in FIG. 7, terminal device 5 notifies the plurality of luminaires 1 and the plurality of wireless IF devices 2 of each of the actual addresses each is associated with in final pairing data 68, and causes them to store, as an actual address of a communication partner, each of the notified actual addresses.

In the final pairing process, the process of associating luminaires 1 with wireless IF devices 2 is not necessary; it is sufficient if the provisional addresses are associated with, or overwritten with, actual addresses. This makes it possible to reduce the time and work required to perform pairing (final pairing process) in the installation phase.

(2.4 Detailed Example of Pairing Change Process)

Next, an example of the pairing change process will be described in detail.

Figures 23, 24:
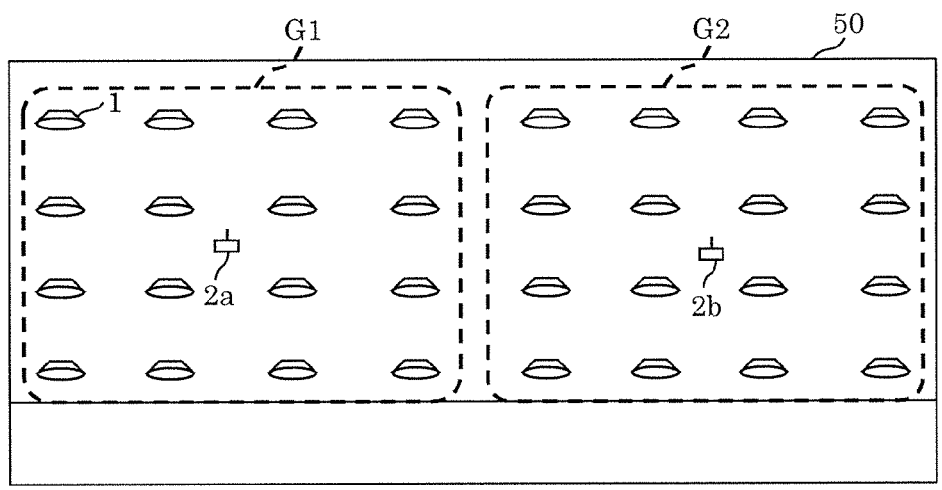
FIG. 23 illustrates an example of operational groups.
FIG. 24 illustrates an example of operational group data indicating the operational groups illustrated in FIG. 23.

FIG. 23 illustrates an example of operational groups. The dashed lines in FIG. 23 indicate operational groups G1 and G2. Operational group G1 in FIG. 23 matches the pairing group that includes luminaires 1 paired to the wireless IF device 2 on the left side of FIG. 20. Operational group G2 in FIG. 23 matches the pairing group that includes luminaires 1 paired to the wireless IF device 2 on the right side of FIG. 20.

Accordingly, the control signals received by luminaires 1 belonging to the same operational group are wirelessly transmitted from the same wireless IF device 2. Although the luminaires 1 belonging to the same operational group receive the wirelessly transmitted control signals at different times, when the operational group and the pairing group match, the difference is not great. As a result, when a control signal for changing a lighting operation is transmitted from controller 3, although the luminaires 1 belonging to the same operational group technically receive the control signal at slightly different times, the change in the lighting operation appears to occur at the same time across the luminaires 1 to the naked eye.

FIG. 24 illustrates an example of operational group data 69 indicating the operational groups illustrated in FIG. 23. Operational group data 69 illustrated in FIG. 24 includes, for each group, actual addresses of luminaires 1 belonging to that group and a switch number corresponding to that group. Note that when an operational group is not to be associated with a switch operation, operational group data 69 need not include a switch number.

Next, an example of making a change to an operational group will be given.

Figures 25, 26:
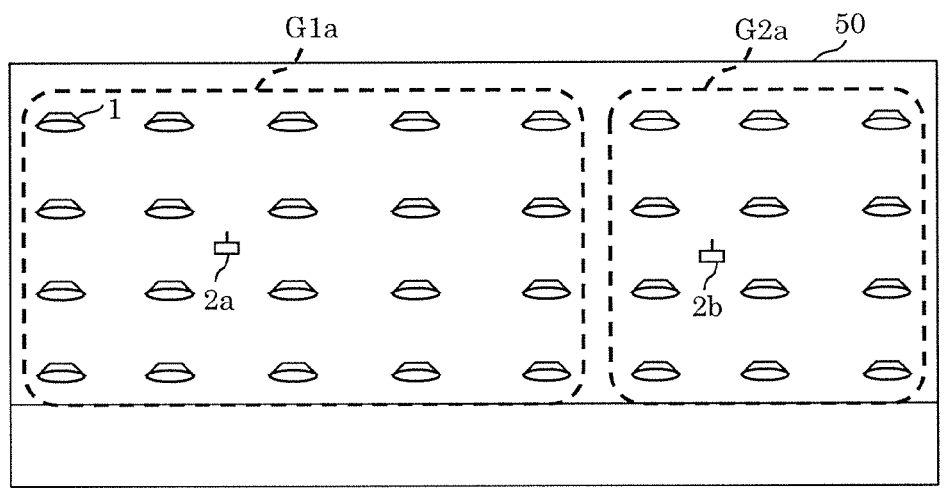
FIG. 25 illustrates an example in which a change is made to the operational groups illustrated in FIG. 23.
FIG. 26 illustrates an example of changed operational group data.

FIG. 25 illustrates an example in which a change is made to the operational groups illustrated in FIG. 23. FIG. 26 illustrates an example of operational group data 69c indicating the changed operational groups illustrated in FIG. 25. The dashed lines in FIG. 25 indicate the changed operational groups G1a and G2a. Changed operational group G2a differs from operational group G2 illustrated in FIG. 23 in that four luminaires 1 have been removed. Changed operational group G1a differs from operational group G1 in that the four luminaires 1 removed from operational group G2 have been added. Changed operational group G1a does not match the pairing group that includes luminaires 1 paired to the wireless IF device 2 on the left side of FIG. 20. Changed operational group G2a does not match the pairing group that includes luminaires 1 paired to the wireless IF device 2 on the right side of FIG. 20.

Accordingly, luminaires 1 that had belonged to operational group G1 among luminaires 1 currently belonging to changed operational group G1a receive control signals wirelessly transmitted from the wireless IF device 2 on the left side, and the four luminaires 1 that had belonged to operational group G2 among luminaires 1 currently belonging to changed operational group G1a receive control signals wirelessly transmitted from wireless IF device 2 on the right side. For example, when controller 3 causes luminaires 1 belonging to changed operational group G1a to perform a lighting operation—such as turn on, turn off, dim, or change in color—at the same time, there are instances when the difference in timing between the lighting operation performed by luminaires 1 that had belonged to operational group G1 and the lighting operation performed by four luminaires 1 that had belonged to operational group G2 is great enough to be noticeable to the naked eye. This is because there is a time lag between the control signals wirelessly transmitted to luminaires 1 by controller 3 via the left side wireless IF device 2 and the control signals wirelessly transmitted to luminaires 1 by controller 3 via the right side wireless IF device 2 that is great enough to be noticeable to the naked eye.

On the other hand, although changed operational group G2a does not match the pairing group that includes luminaires 1 paired to the wireless IF device 2 on the right side, operational group G2a is a subset of that pairing group. Accordingly, each of luminaires 1 belonging to changed operational group G2a receive control signals wirelessly transmitted from the right side wireless IF device 2, which does not result in a large time difference.

As described above, there are instances when there is a time difference between lighting operations across luminaires 1 belonging to changed operational group G1a that is great enough to be noticeable to the naked eye. In order to overcome this problem, terminal device 5 performs a pairing change process.

Figure 11:
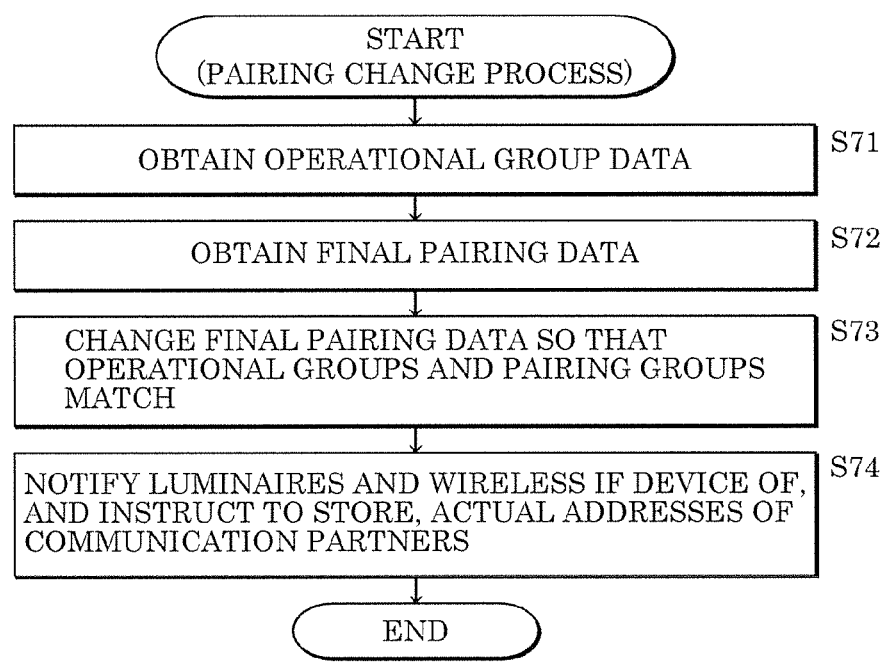
FIG. 11 is a flow chart illustrating a more detailed example of the process in step S7 (pairing change process) in FIG. 7.

FIG. 11 is a flow chart illustrating a more detailed example of the process in step S7 (pairing change process) in FIG. 7. As illustrated in FIG. 11, terminal device 5 obtains changed operational group data 69 (S71), and obtains final pairing data 68 (S72). Note that when terminal device 5 changes operational group data 69, and operational group data 69 and final pairing data 68 are already stored, steps S71 and S72 may be omitted.

Terminal device 5 then changes final pairing data 68 such that the obtained operational group and the pairing group indicated in final pairing data 68 match (S73), and, in accordance with the changed final pairing data 68, notifies plurality of luminaires 1 and plurality of wireless IF devices 2 of, and causes them to store, the actual addresses of their communication partners (S74). In step S74, it is sufficient if only those luminaires 1 and wireless IF devices 2 whose pairing information was changed are notified.

Examples of the changed final pairing data are illustrated in FIG. 27 and FIG. 28. FIG. 27 illustrates an example of final pairing data 68a for luminaires 1 corresponding to operational groups G1a and G2a illustrated in FIG. 25. FIG. 28 illustrates an example of final pairing data 68b for wireless IF devices 2 corresponding to operational groups G1a and G2a illustrated in FIG. 25. The pairing groups indicated in the final pairing data illustrated in FIG. 27 and FIG. 28 match changed operational groups G1a and G2a. This prevents a great time difference between lighting operations performed by luminaires 1 in the operational groups from occurring.

As described above, the pairing method according to this embodiment is for use in a lighting system including a plurality of wireless IF devices 2 that wirelessly transmit a control signal and a plurality of luminaires 1 that receive the control signal, to determine communication partners among the plurality of luminaires 1 and the plurality of wireless IF devices 2, and includes: obtaining a layout map indicating a layout of the plurality of luminaires 1 and the plurality of wireless IF devices 2; displaying the layout map on display panel 51; generating provisional pairing data by assigning provisional addresses to the plurality of luminaires 1 and the plurality of wireless IF devices 2 indicated on the displayed layout map and by associating the provisional addresses assigned to the plurality of wireless IF devices 2 with the provisional addresses assigned to the plurality of luminaires 1 in a one-to-many relationship; storing the provisional pairing data into a storage unit; in a hardware installation phase in which the plurality of luminaires 1 and the plurality of wireless IF devices 2 are installed in accordance with the layout map, generating final pairing data by associating the provisional addresses in the provisional pairing data with actual addresses of the plurality of luminaires 1, which are pre-assigned to the plurality of luminaires 1; and notifying the plurality of luminaires 1 and the plurality of wireless IF devices 2 of each of the actual addresses each is associated with in the final pairing data, and causing the plurality of luminaires 1 and the plurality of wireless IF devices 2 to store, as an actual address of a communication partner, each of the actual addresses notified.

This makes it possible to reduce the time and work required to perform pairing.

Here, the generating of the provisional pairing data may include: calculating, by using a computer, distances from each of the plurality of wireless IF devices 2 to each of the plurality of luminaires 1 on the layout map; identifying, among the plurality of luminaires 1, one or more luminaires 1 calculated to have a distance less than a predetermined value from a given wireless IF device 2 among the plurality of wireless IF devices 2; and associating the one or more luminaires 1 identified in the identifying with the given wireless IF device 2.

This makes it possible to reduce the time and work required to associate luminaires 1 and wireless IF devices 2 in the generation of the provisional pairing data, even when there are many luminaires 1.

Here, the generating of the provisional pairing data may further include: determining, by the computer, whether a total number N1 of the plurality of luminaires 1 that are redundantly associated with two or more of the plurality of wireless IF devices 2 is greater than a threshold th1; and changing the predetermined value and performing the identifying and the associating again, after it is determined that the total number N1 is greater than the threshold th1.

This makes it possible to automatically reduce the number N1 of luminaires 1 redundantly associated with two or more wireless IF devices 2 to threshold th1 or less, and thus reduce the time and work required to perform the association.

This makes it possible to reduce time and work in the associating of luminaires 1 and wireless IF devices 2.

Here, the generating of the provisional pairing data may further include: determining, by the computer, whether a total number N2 of the plurality of luminaires 1 that are not associated with any of the plurality of wireless IF devices 2 is greater than a threshold th2; and changing the predetermined value and performing the identifying and the associating again, after it is determined that the total number N2 is greater than the threshold th2.

This makes it possible to automatically reduce the number N2 of luminaires 1 not associated with any wireless IF device 2 to threshold th2 or less, and thus reduce the time and work required to perform the association.

Here, the generating of the provisional pairing data may further include: determining, by the computer, whether the layout map includes an obstruction to electromagnetic wave propagation between a luminaire 1 and a wireless IF device 2 that are associated among the plurality of luminaires 1 and the plurality of wireless IF devices 2; and after it is determined that the layout map includes the obstruction, notifying a user that the layout map includes the obstruction.

This makes it possible to avoid the pairing of a luminaire 1 and a wireless IF device 2 between which wireless communication is troublesome due to the presence of an obstruction, by presenting a warning. Moreover, even if the building in which the lighting system is to be installed is not completed, an obstruction can be easily identified from the layout map.

Here, the obstruction may include at least one of a pillar of a building and a wall of the building on the layout map.

This makes it easy to identify an obstruction on the layout map.

Here, the generating of the provisional pairing data may include: associating, on the layout map displayed on display panel 51, a luminaire 1 and a wireless IF device 2 among the plurality of luminaires 1 and the plurality of wireless IF devices 2, in accordance with a user input.

This makes it possible to generate provisional pairing data manually for the most part, that is to say, by receiving a user input instructing an association be made.

Here, the generating of the provisional pairing data may include: associating the one or more luminaires 1 with a given wireless IF device 2 by assigning a same provisional address to the one or more luminaires 1 and the given wireless IF device 2.

This makes it possible to perform the association automatically for the most part, that is to say, by terminal device 5 executing the pairing method.

Here, the generating of the provisional pairing data may include: assigning a same provisional address to each of the plurality of luminaires 1 to be associated with a same one of the plurality of wireless IF devices 2.

This makes it possible to reduce the processing time required to generate provisional pairing data via the above-described association. Moreover, since displaying the provisional address on the layout map makes them and their associations more visible to the user, the user is less likely to perform an erroneous operation.

Here, the generating of the provisional pairing data may further include: assigning the plurality of luminaires 1 that are associated with a same one of the plurality of wireless IF devices 2 to an operational group for collective lighting operation.

This makes it possible to reduce the processing time required to generate provisional pairing data via the above-described association. Moreover, since displaying the provisional address on the layout map makes them and their associations more visible to the user, the user is less likely to perform an erroneous operation.

Here, the generating of the provisional pairing data may include: dividing the plurality of luminaires 1 into operational groups for collective lighting operation; and associating each of the plurality of luminaires 1 included in a same one of the operational groups with a same one of the plurality of wireless IF devices 2.

With this, it is possible to make a group of luminaires 1 associated with the same wireless IF device 2 (i.e., a pairing group) and the operational group match. As a result, in the operational phase, it is possible to inhibit a great time difference from occurring between lighting operations (for example, turning on, turning off) performed across luminaires 1 in the same operational group.

Here, the pairing method may further include: determining whether a change has been made to the operational group after the generating of the final pairing data; and after it is determined that a change has been made in the determining, changing the final pairing data such that the operational group and a group of the plurality of luminaires 1 that are paired to a same one of the plurality of wireless IF devices 2 match.

With this, even when a change is made to the members of an operational group, it is possible to inhibit a great time difference from occurring between lighting operations (for example, turning on, turning off) performed across luminaires 1 in the same operational group.

As described above, the pairing device (i.e., terminal device 5) according to this embodiment is for use in a lighting system including a plurality of wireless IF devices 2 that wirelessly transmit a control signal and a plurality of luminaires 1 that receive the control signal, the pairing device determining communication partners among the plurality of luminaires 1 and the plurality of wireless IF devices 2, and includes: display panel 51; an input unit (i.e., touch panel 52) configured to receive a user input; processor 53 that executes a program; storage unit 54 configured to store the program; and wireless circuit 55. The pairing device: obtains a layout map indicating a layout of the plurality of luminaires 1 and the plurality of wireless IF devices 2; displays the layout map on display panel 51; generates provisional pairing data by assigning provisional addresses to the plurality of luminaires 1 and the plurality of wireless IF devices 2 indicated on the displayed layout map and by associating the provisional addresses assigned to the plurality of wireless IF devices 2 with the provisional addresses assigned to the plurality of luminaires 1 in a one-to-many relationship; stores the provisional pairing data into storage unit 54; in a hardware installation phase in which the plurality of luminaires 1 and the plurality of wireless IF devices 2 are installed in accordance with the layout map, generates final pairing data by associating the provisional addresses in the provisional pairing data with actual addresses of the plurality of luminaires 1, which are pre-assigned to the plurality of luminaires 1; and, via wireless circuit 55, notifies the plurality of luminaires 1 and the plurality of wireless IF devices 2 of each of the actual addresses each is associated with in the final pairing data, and causes the plurality of luminaires 1 and the plurality of wireless IF devices 2 to store, as an actual address of a communication partner, each of the actual addresses notified.

This makes it possible to reduce the time and work required to perform pairing.

Hereinbefore, the pairing method and the pairing device according to the present disclosure has been described based on an embodiment, but the pairing method and the pairing device are not limited to the embodiment. Various modifications of the embodiment as well as embodiments resulting from arbitrary combinations of constituent elements of the embodiment and variations thereof that may be conceived by those skilled in the art are intended to be included within the scope of the present disclosure as long as these do not depart from the essence of the present disclosure.

What is claimed is:

1. A pairing method to determine communication partners among a plurality of luminaires and a plurality of wireless interface (IF) devices, the pairing method comprising:
    obtaining a layout map indicating a layout of the plurality of luminaires and the plurality of wireless IF devices;
    displaying the layout map on a display
    generating provisional pairing data by assigning provisional addresses to the plurality of luminaires and the plurality of wireless IF devices indicated on the displayed layout map and by associating the provisional addresses assigned to the plurality of wireless IF devices with the provisional addresses assigned to the plurality of luminaires in a one-to-many relationship;
    storing the provisional pairing data into a memory;
    in a hardware installation phase in which the plurality of luminaires and the plurality of wireless IF devices are installed in accordance with the layout map, generating final pairing data by associating the provisional addresses in the provisional pairing data with actual addresses of the plurality of luminaires, which are pre-assigned to the plurality of luminaires; and
    notifying the plurality of luminaires and the plurality of wireless IF devices of each of the actual addresses each is associated with in the final pairing data, and causing the plurality of luminaires and the plurality of wireless IF devices to store, as an actual address of a communication partner, each of the actual addresses notified.

2. The pairing method according to claim 1, wherein the generating of the provisional pairing data includes:
    calculating, by using a computer, distances from each of the plurality of wireless IF devices to each of the plurality of luminaires on the layout map;
    identifying, among the plurality of luminaires, one or more luminaires calculated to have a distance less than a predetermined value from a given wireless IF device among the plurality of wireless IF devices; and
    associating the one or more luminaires identified in the identifying with the given wireless IF device.

3. The pairing method according to claim 2, wherein the generating of the provisional pairing data further includes:
    determining, by the computer, whether a total number of the plurality of luminaires that are redundantly associated with two or more of the plurality of wireless IF devices is greater than a threshold; and
    changing the predetermined value and performing the identifying and the associating again, after it is determined that the total number is greater than the threshold.

4. The pairing method according to claim 2, wherein the generating of the provisional pairing data further includes:
    determining, by the computer, whether a total number of the plurality of luminaires that are not associated with any of the plurality of wireless IF devices is greater than a threshold; and
    changing the predetermined value and performing the identifying and the associating again, after it is determined that the total number is greater than the threshold.

5. The pairing method according to claim 2, wherein the generating of the provisional pairing data further includes:
    determining, by the computer, whether the layout map includes an obstruction to electromagnetic wave propagation between a luminaire and a wireless IF device that are associated among the plurality of luminaires and the plurality of wireless IF devices; and
    after it is determined that the layout map includes the obstruction, notifying a user that the layout map includes the obstruction.

6. The pairing method according to claim 5, wherein the obstruction includes at least one of a pillar of a building and a wall of the building on the layout map.

7. The pairing method according to claim 2, wherein the generating of the provisional pairing data includes:

associating one or more luminaires with a given wireless IF device by assigning a same provisional address to the one or more luminaires and the given wireless IF device.

8. The pairing method according to claim 2, wherein the generating of the provisional pairing data includes:
assigning a same provisional address to each of the plurality of luminaires to be associated with a same one of the plurality of wireless IF devices.

9. The pairing method according to claim 2, wherein the generating of the provisional pairing data further includes:
assigning the plurality of luminaires that are associated with a same one of the plurality of wireless IF devices to an operational group for collective lighting operation.

10. The pairing method according to claim 9, further comprising:
determining whether a change has been made to the operational group after the generating of the final pairing data; and
after it is determined that a change has been made in the determining, changing the final pairing data such that the operational group and a group of the plurality of luminaires that are paired to a same one of the plurality of wireless IF devices match.

11. The pairing method according to claim 2, wherein the generating of the provisional pairing data includes:
dividing the plurality of luminaires into operational groups for collective lighting operation; and
associating each of the plurality of luminaires included in a same one of the operational groups with a same one of the plurality of wireless IF devices.

12. The pairing method according to claim 1, wherein the generating of the provisional pairing data includes:
associating, on the layout map displayed on the display, a luminaire and a wireless IF device among the plurality of luminaires and the plurality of wireless IF devices, in accordance with a user input.

13. A pairing device for determining communication partners among a plurality of luminaires and a plurality of wireless interface (IF) devices, the pairing device comprising:
a display; an input unit configured to receive a user input; a processor that executes a program; a memory configured to store the program; and a wireless circuit,
wherein the pairing device:
obtains a layout map indicating a layout of the plurality of luminaires and the plurality of wireless IF devices;
displays the layout map on the display;
generates provisional pairing data by assigning provisional addresses to the plurality of luminaires and the plurality of wireless IF devices indicated on the displayed layout map and by associating the provisional addresses assigned to the plurality of wireless IF devices with the provisional addresses assigned to the plurality of luminaires in a one-to-many relationship;
stores the provisional pairing data into the memory;
in a hardware installation phase in which the plurality of luminaires and the plurality of wireless IF devices are installed in accordance with the layout map, generates final pairing data by associating the provisional addresses in the provisional pairing data with actual addresses of the plurality of luminaires, which are pre-assigned to the plurality of luminaires; and
via the wireless circuit, notifies the plurality of luminaires and the plurality of wireless IF devices of each of the actual addresses each is associated with in the final pairing data, and causes the plurality of luminaires and the plurality of wireless IF devices to store, as an actual address of a communication partner, each of the actual addresses notified.

14. The pairing device according to claim 13, wherein when generating the provisional pairing data, the pairing device:
calculates distances from each of the plurality of wireless IF devices to each of the plurality of luminaires on the layout map;
identifies, among the plurality of luminaires, one or more luminaires calculated to have a distance less than a predetermined value from a given wireless IF device among the plurality of wireless IF devices; and
associates the one or more luminaires identified with the given wireless IF device.

15. The pairing device according to claim 14, wherein when generating the provisional pairing data, the pairing device further:
determines whether a total number of the plurality of luminaires that are redundantly associated with two or more of the plurality of wireless IF devices is greater than a threshold; and
changes the predetermined value and identifies and associates the luminaire again if the total number is determined to be greater than the threshold.

16. The pairing device according to claim 14, wherein when generating the provisional pairing data, the pairing device further:
determines whether a total number of the plurality of luminaires that are not associated with any of the plurality of wireless IF devices is greater than a threshold; and
changes the predetermined value and identifies and associates the luminaire again if the total number is determined to be greater than the threshold.

17. The pairing device according to claim 14, wherein when generating the provisional pairing data, the pairing device further:
determines whether the layout map includes an obstruction to electromagnetic wave propagation between a luminaire and a wireless IF device that are associated among the plurality of luminaires and the plurality of wireless IF devices; and
notifies a user if the layout map is determined to include the obstruction.

18. The pairing device according to claim 17, wherein the obstruction includes at least one of a pillar of a building and a wall of the building on the layout map.

19. The pairing device according to claim 14, wherein when generating the provisional pairing data, the pairing device:
associates one or more luminaires with a given wireless IF device by assigning a same provisional address to the one or more luminaires and the given wireless IF device.

20. The pairing device according to claim 13, wherein when generating the provisional pairing data, the pairing device:
associates, on the layout map displayed, a luminaire and a wireless IF device among the plurality of luminaires and the plurality of wireless IF devices, in accordance with a user input.

\* \* \* \* \*